United States Patent [19]

Drewery et al.

[11] 4,322,739

[45] Mar. 30, 1982

[54] PROCESSING OF N.T.S.C. COLOR TELEVISION SIGNALS

[75] Inventors: John O. Drewery, Coulsdon; Martin Weston, Epsom, both of England

[73] Assignee: British Broadcasting Corporation, London, England

[21] Appl. No.: 137,697

[22] Filed: Apr. 7, 1980

[51] Int. Cl.³ .............................................. H04N 9/32
[52] U.S. Cl. ...................................................... 358/13
[58] Field of Search ........................................... 358/13

[56] References Cited

U.S. PATENT DOCUMENTS 4,151,550  4/1979  Dinstein .................................. 358/13
4,164,749  8/1979  Heitmann et al. ..................... 358/13
4,227,204  10/1980 Rossi ....................................... 358/13

Primary Examiner—Richard Murray
Attorney, Agent, or Firm—Robert F. O'Connell

[57] ABSTRACT

Digital sampling of the luminance component of an N.T.S.C. color television signal is achieved by sampling with a mean frequency of twice the color subcarrier frequency to produce a sub-Nyquist sampled luminance signal. The sampling phase is changed between each pair of lines by an amount equal to half the interval between samples. The digital sampling can be applied to separate luminance and chrominance signals, to encoded N.T.S.C., and to the conversion of N.T.S.C. signals into signals of other form including PAL. Further, phase-perturbed sampling techniques permit the construction of an advantageous N.T.S.C. coder and de-coder system. The coder operates to cause spectrum folding of a luminance input signal by multiplying by a phase perturbed signal of twice the color subcarrier, and adding, the resultant being comb filtered to select frequencies which are multiples of the line frequency. The chrominance signals I, Q are combined into I±Q and are modulated onto phase-perturbed subcarrier, the resultant being comb filtered to select frequencies which are of integral multiples of half the line frequencies. The two signals are then added.

The comb filters mentioned can be based on one line delays or on odd multiples of one line, particularly 263 or 525 lines. A converse decoder filters then spectrum folds the luminance component, and filters and multiplies by subcarrier to derive the chrominance. Once an N.T.S.C. signal has been encoded by use of the encoder, subsequent decoding and recoding produces no theoretical impairment into the signal.

6 Claims, 45 Drawing Figures

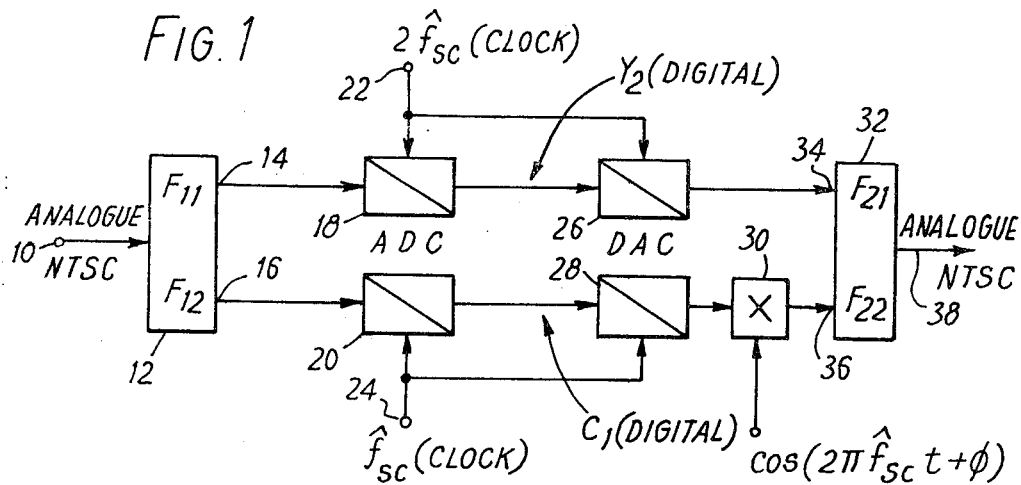
FIG. 1
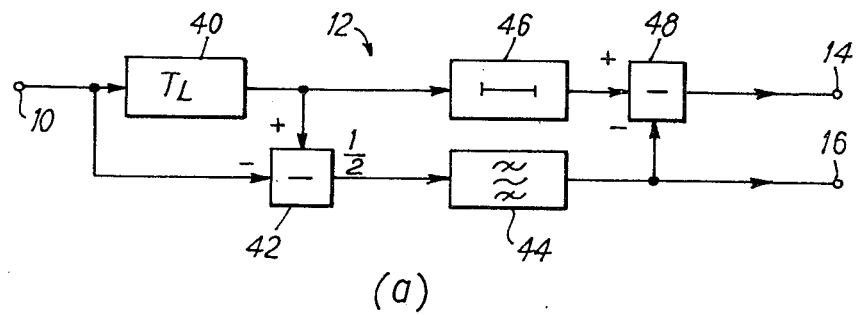
FIG. 2
(a)
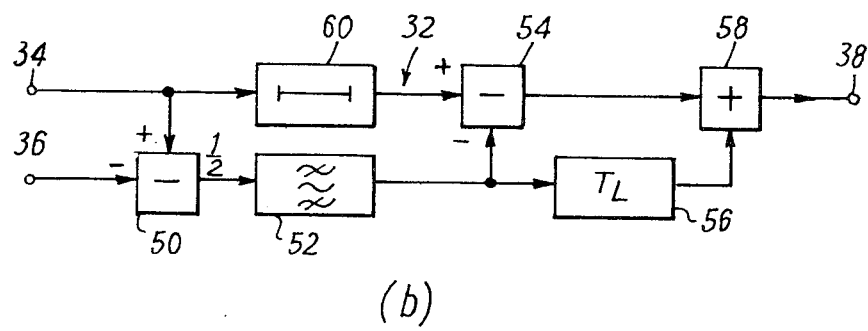
(b)

FIG. 6
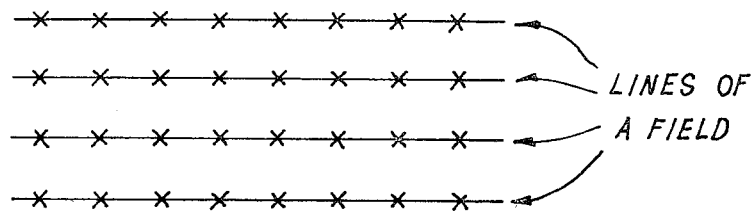
(a)
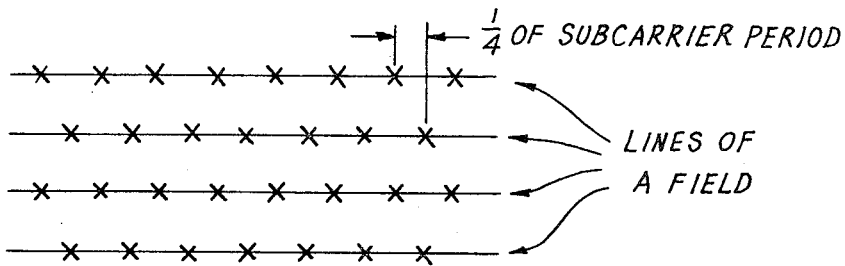
(b)
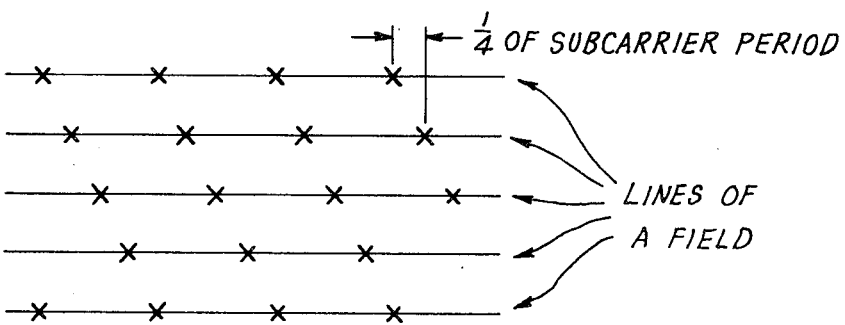
(c)
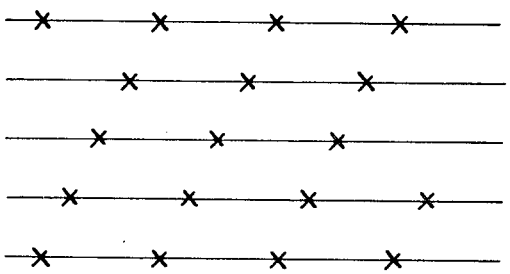
(d)

```
0 2 0      0 2 4 6 0      FIG. 9
3 1 3      3 5 7 1 3
2 0 2      6 0 2 4 6
1 3 1      1 3 5 7 1
0 2 0      4 6 0 2 4
  y        7 1 3 5 7
           2 4 6 0 2    I/Q
           5 7 1 3 5
           0 2 4 6 0
```
FIG. 10
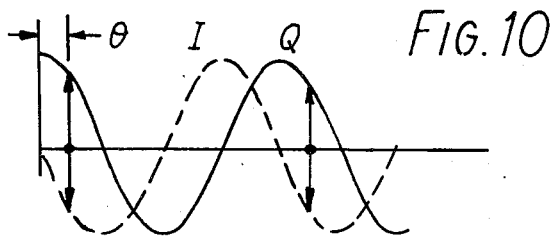
SAMPLE VALUES
$Q \cos \theta - I \sin \theta$
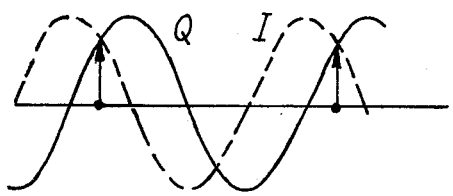
$Q \sin \theta + I \cos \theta$
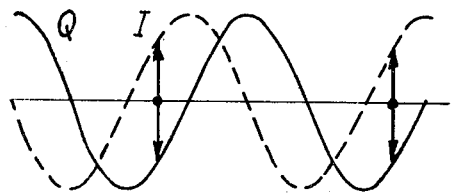
$-Q \sin \theta + I \sin \theta$
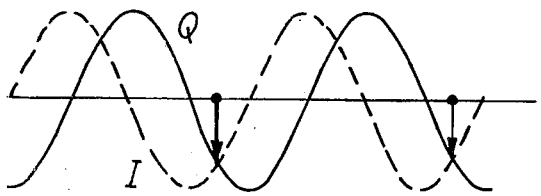
$-Q \sin \theta - I \cos \theta$
$U = Q \cos 33° - I \sin 33°$
$V = Q \sin 33° + I \cos 33°$
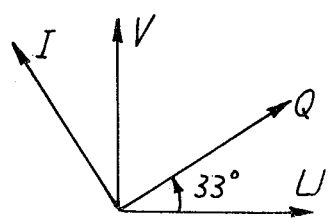

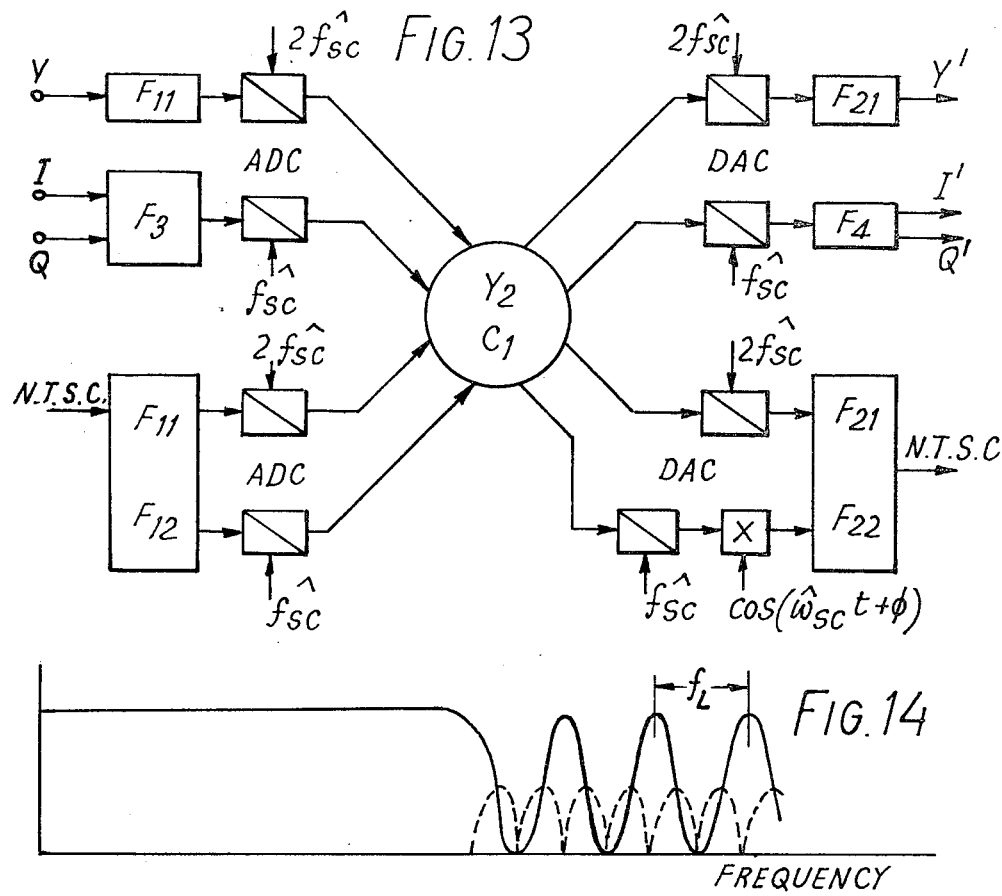
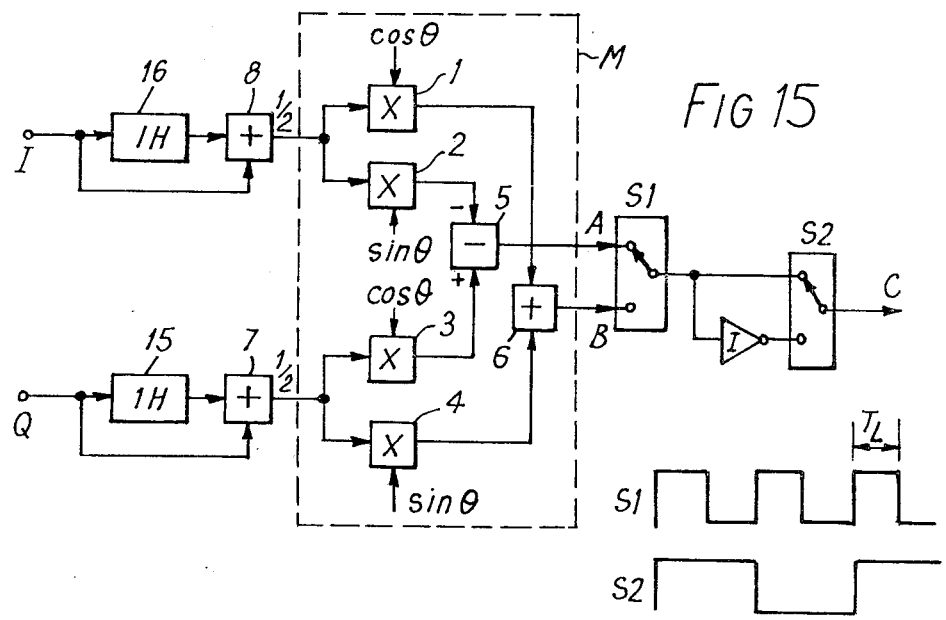

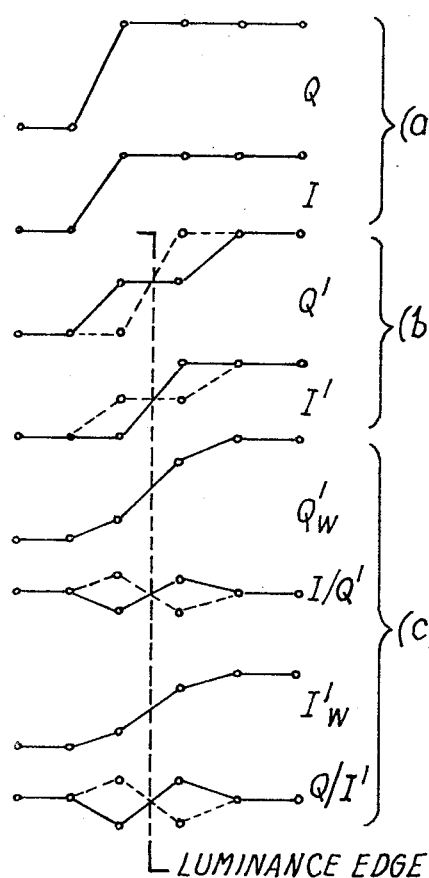
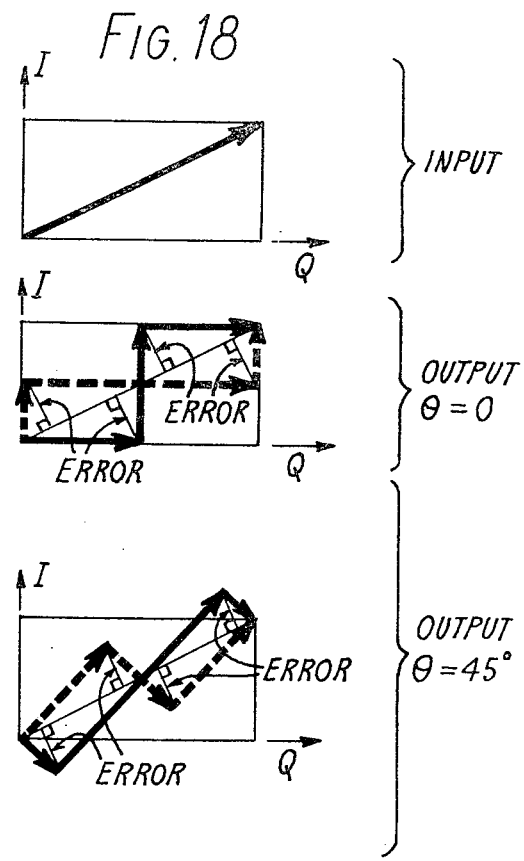
FIG. 18
FIG. 19

$$C_{21} = \tfrac{1}{2}(A_{11} + A_{21})$$
$$C_{32} = \tfrac{1}{2}(B_{22} + B_{32})$$
$$C_{43} = -\tfrac{1}{2}(A_{33} + A_{43})$$
$$C_{54} = -\tfrac{1}{2}(B_{44} + B_{54})$$

$$A_{11} = Q_{11}\cos\theta - I_{11}\sin\theta$$
$$B_{22} = Q_{22}\sin\theta + I_{22}\cos\theta$$
$$etc.$$

FIG. 23

$Q_{21}'' = C_{21} \cos\theta,\ Q_{24}'' = Q_{14}''$
$I_{21}'' = -C_{21} \sin\theta,\ I_{24}'' = I_{14}''$
$Q_{32}'' = C_{32} \sin\theta,\ Q_{35}'' = Q_{25}''$
$I_{32}'' = C_{32} \cos\theta,\ I_{35}'' = I_{25}''$
$Q_{43}'' = -C_{43} \cos\theta,\ Q_{42}'' = Q_{32}''$
$I_{43}'' = C_{43} \sin\theta,\ I_{42}'' = I_{32}''$
$Q_{54}'' = -C_{54} \sin\theta,\ Q_{53}'' = Q_{43}''$
$I_{54}'' = -C_{54} \cos\theta,\ I_{53}'' = I_{43}''$

FIG. 24

$C_{24}'' = -\frac{1}{2}(B_{14}'' + B_{24}'')$
$C_{31}'' = \frac{1}{2}(A_{21}'' + A_{31}'')$
$C_{42}'' = \frac{1}{2}(B_{32}'' + B_{42}'')$
$C_{53}'' = -\frac{1}{2}(A_{43}'' + A_{53}'')$ $A_{21}'' = Q_{21}'' \cos\theta - I_{21}'' \sin\theta$
$B_{32}'' = Q_{32}'' \sin\theta + I_{32}'' \cos\theta$
etc.

s/c = STANDARDS CONVERTER

B/S = BUFFER & SWITCH

PROCESSING OF N.T.S.C. COLOR TELEVISION SIGNALS

BACKGROUND OF THE INVENTION

This invention relates to the processing of digital N.T.S.C. colour television signals.

Our British Pat. Nos. 1,534,268-270 have described the use with digital PAL colour television signals of separated signals in the form of a luminance signal $Y_2$ sampled at twice the colour subcarrier frequency and a composite chrominance signal $C_1$ sampled at the colour subcarrier frequency $f_{sc}$ itself. The total sample rate requirement is thus three times the colour subcarrier frequency. The composite chrominance signal was in a special form, consisting of the sum and difference of the colour difference signals U and V on alternate lines, i.e. U+V on one line and U−V on the next.

The $Y_2/C_1$ combination is in a form which can be convenient for switching and mixing, for transmission, or for recording.

This invention is concerned to provide a solution to problems arising in attempting to derive a corresponding $Y_2/C_1$ system for N.T.S.C. signals.

It will be appreciated that the sampling frequency $2f_{sc}$ used for the luminance signal is a sub-Nyquist frequency, that is, it is less than twice the maximum video frequency which is to be transmitted. This sub-Nyquist frequency can only be used because of the line periodicity of the television signal. If it is assumed for the moment that there is no line-to-line variation in the signals, the spectral components of the luminance signal will tend to congregate around integral multiples of the line frequency $f_L$. These spectral components of say $nf_L$ will after sampling cause alias components due to spectrum folding of frequency $2f_{sc}-nf_L$. Now, in the PAL system, $f_{sc}$ is substantially equal to an odd integral multiple of one-quarter of the line frequency, i.e. $(m\pm\frac{1}{4})f_L$. Thus twice the subcarrier frequency is substantially equal to an odd integral multiple of one-half of the line frequency, i.e. $(m'+\frac{1}{2})f_L$. Thus the alias components which are of the form $\{(m'+\frac{1}{2}(f_L-nf_L)\}$ will also always congregate around odd integral multiples of one-half of the line frequency. Using this property it is possible to remove these alias components by means of a comb filter which passes components equal to integral multiples of the line frequency but which stops components which are equal to odd integral multiples of half the line frequency.

Where line-to-line variations occur there will be residual alias components, but in practical television signals the sampling system works well without introducing subjectively noticeable degradation.

However such a filtering system cannot be used with N.T.S.C. signals, because in the N.T.S.C. system the colour subcarrier frequency is itself equal to an odd integral multiple of one-half (rather than one-quarter) of the line frequency $F_L$, namely $(n+\frac{1}{2}f_L)$. Twice this frequency is an exact multiple of the line frequency. Thus, input signal components which are themselves multiples of the line frequency will also produce alias components which are multiples of the line frequency. These components cannot be separated by comb filtering.

From this it would seem that it is impossible to sample the separated luminance and colour difference baseband signal components at twice the N.T.S.C. colour subcarrier frequency without introducing substantial impairment into the signals.

It should be noted that the sampling of the composite N.T.S.C. signal has already been proposed by John P. Rossi, see *SMPTE Journal*, Vol. 85, No. 1, Jan. 1976, pages 1 to 6, "Sub-Nyquist-encoded PCM NTSC Colour Television" and *IEE Conference Publication No. 166*, pages 218 to 221, "Sub-Nyquist sampled PCM NTSC Color TV Signal Derived from Four Times the Color Subcarrier", (International Broadcasting Convention 1978).

An improved method is described in our British Pat. application No. 7902912 (V. G. Devereux), publication No. 2,040,640. The problems involved in encoding to give samples directly representative of an encoded composite N.T.S.C. signal are however quite different from those involved in obtaining the sampled luminance signal $Y_2$.

SUMMARY OF THE INVENTION

In accordance with this invention we provide a method of and apparatus for digitally sampling the luminance component of a N.T.S.C. colour television signal in which the signal is sampled with a mean frequency of twice the colour subcarrier frequency to produce a sampled luminance signal, but in which the sampling phase is changed between each pair of lines by an amount equal to half the interval between samples.

The invention is applicable to the sampling of separate luminance and chrominance signals, to the sampling of encoded N.T.S.C. signals, and to the conversion of N.T.S.C. signals into signals of other form, as will become apparent from the following description.

BRIEF DESCRIPTION OF THE DRAWINGS

The invention will now be described in more detail, by way of example, with reference to the drawings, in which:

FIG. 1 is a block circuit diagram of a system embodying the invention for sampling an analogue N.T.S.C. signal and recreating the analogue signal from the sampled signal;

FIG. 2 (comprised of a and b) illustrates two filter units used in the system of FIG. 1;

FIG. 6 (comprised of a, b, c and d) shows the sampling sites on a few lines of N.T.S.C. when sampled at (a) $2f_{sc}$, (b) $2\hat{f}_{sc}$, and (c) and (d) $\hat{f}_{sc}$;

FIG. 9 illustrates the periodicity of the $Y_2$ and $C_1$ signals;

FIG. 10 illustrates sample values of the chrominance signal $C_1$ on different lines;

FIG. 13 is a diagram illustrating the use of the $Y_2/C_1$ signals in translating between YIQ and encoded N.T.S.C.;

FIG. 14 is a spectrum diagram illustrating residual aliasing;

FIG. 15 is a circuit diagram of a pre-filter unit for use in the system of FIG. 13;

FIG. 18 (comprised of a, b and c) illustrates the response in the presense of pre-filtering;

FIG. 19 is a diagram illustrating which of the $4f_{sc}$ I and Q samples contribute to form $C_1$ samples;

FIG. 23 illustrates the structure of I" and Q" signals;

FIG. 24 defines chrominance samples C";

DETAILED DESCRIPTION OF THE PREFERRED EMBODIMENTS

Figure 3:
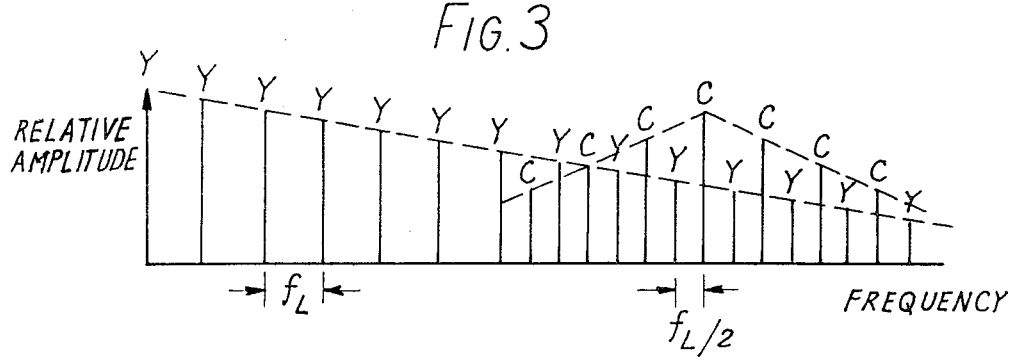
FIG. 3 shows the relationship of the main luminance and chrominance components of an N.T.S.C. signal.

In FIG. 1 an analogue N.T.S.C. signal is received at an input 10 and applies to a filtering unit 12 which has two outputs 14, 16 and provides two filtering functions $F_{11}$ and $F_{12}$ respectively. Filtered luminance appears at output 14 and is applied to an analogue-to-digital converter (ADC) 18, while filtered modulated chrominance appearing at output 16 is applied to an ADC 20. In ADC 18 the luminance signal is sampled in response to a phase-perturbed clock signal $2\hat{f}_{sc}$ of mean frequency $2f_{sc}$ received at an input 22, as described below, to give a luminance signal $Y_2$ sampled at $2\hat{f}_{sc}$. Similarly in ADC 20 the chrominance signal is sampled in response to a corresponding signal $\hat{f}_{sc}$ received at an input 24 to give a chrominance signal $C_1$ sampled at $\hat{f}_{sc}$.

The $Y_2/C_1$ signals can be used for any desired processing steps, such as switching and mixing, transmission or recording. These steps are omitted on FIG. 1 as their precise nature is immaterial for present purposes.

Subsequently the $Y_2/C_1$ signals are converted back to analogue form in respective digital-to-analogue converters (DACs) 26 and 28 which receive respectively clock signals identical with those applied to the ADCs 18 and 20, delayed to compensate for the processing delay. The chrominance output from DAC 28 is then modulated onto a carrier of frequency $\hat{f}_{sc}$ in a modulator 30. The output of DAC 26 is applied to one input 34 of an output filtering unit 32, and the output of modulator 30 is applied to another input 36, the two signals being subjected to filtering functions $F_{21}$ and $F_{22}$ and being combined in a single analogue output signal at 38.

If the filters were perfect, the output signal at 38 would be identical to the input signal at 10, i.e. the system would be "transparent", discounting any delay.

FIG. 2 illustrates the construction of the input and output filtering units 12 and 32. At (a) is shown the unit 12, which comprises a one-line delay 40 connected to the input 10 and having a halving substractor 42 connected to the input and output of the delay. The output of the subtractor 42 is thus a signal in which frequency components which are odd integral components of half the line frequency have been preferentially selected. The output of subtractor 42 is applied to a band-pass filter 44 which covers the chrominance band, and the filter output is connected to the output 16. The output signal at this output thus consists of a pre-filtered chrominance signal from which components which are integral multiples of the line frequency have been removed by comb filtering.

The output of the delay 40 is connected through an equalising delay 46 which compensates for the delay introduced by the band-pass filter 44 to the non-inversion input of a subtractor 48. The inversion input of the subtractor receives the chrominance signal from filter 44. Thus the output signal from the subtractor at terminal 14 consists essentially of the luminance components of the signal, the chrominance components having been subtracted out.

The filtering unit 12 takes advantage of the fact that where there is no line-to-line variation of Y, I and Q signals, the spectral components of the luminance and chrominance components of an N.T.S.C. signal are interleaved, as shown in FIG. 3. A filter which has spectral zeros at odd multiples of half the line frequency may thus select the luminance components, while one that has zeros at multiples of the line frequency may select the chrominance. The filter function $F_{11}$ is effective to average the input signal across the one-line-period delay 40 in the spectral region defined by the bandpass filter 44. Outside the pass band it acts as a simple delay of one line period. The modulus of the spectral characteristic is therefore as shown at (a) in FIG. 4 where the upper limit of the pass band of filter 44 is assumed to be not less than the maximum video frequency $f_v$. The zeros in the characteristic occur at odd multiples of half the line frequency indicating that it selects the luminance component. Likewise the filter function $F_{12}$ is effective to take half of the difference between adjacent lines of the input signal in the pass band of filter 44, and its spectral characteristic is shown at (b) in FIG. 4. The zeros are seen to be interleaved with those of $F_{11}$, and it selects the modulated chrominance.

Where line-to-line variations occur there will be some residual modulated chrominance in the output of filter $F_{11}$ and residual luminance in the output of filter $F_{12}$.

Figure 4:
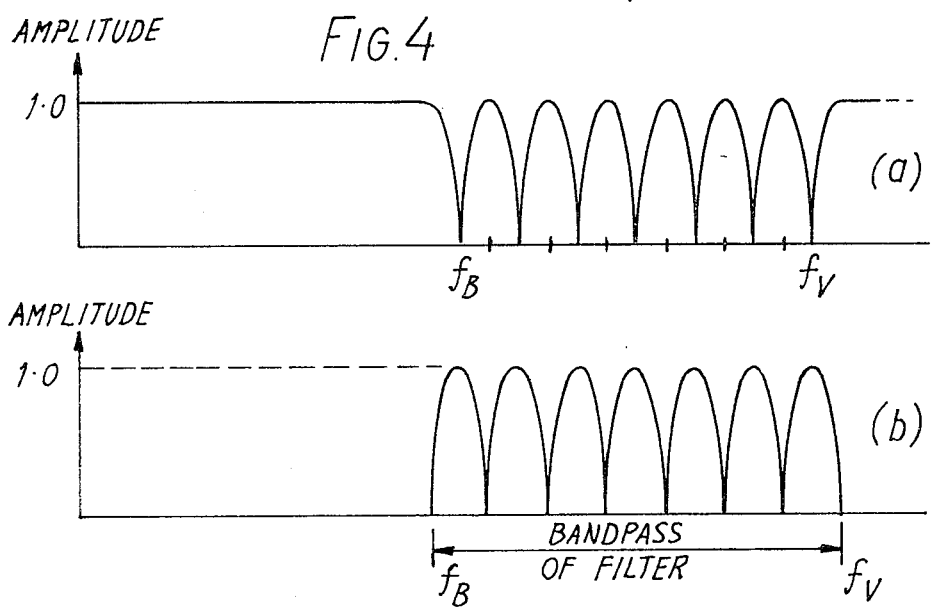
FIG. 4 (comprised of a and b) illustrates the comb filtering of the luminance and chrominance components.

It will be appreciated that the frequency diagrams such as FIGS. 3 and 4 are purely diagrammatic and are not to scale. There will in practice be very many more minima and maxima than those shown, but only a small number are illustrated for clarity.

Figure 5:
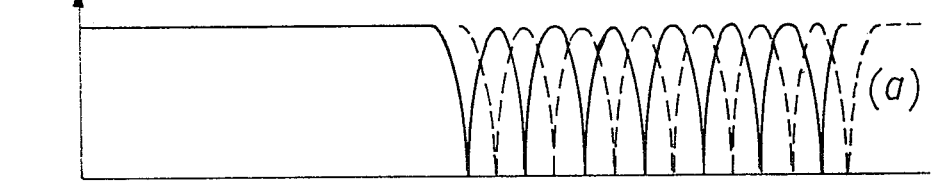
FIG. 5 (comprised of a and b) illustrates the generation of alias components.

The luminance output of filter $F_{11}$ at output 14 of filtering unit 12, having been spectrally comb filtered by the characteristic (a) of FIG. 4, can now be sampled at a frequency which is sub-Nyquist, i.e. lower than twice $f_v$. As described above, this technique has been proposed for use with PAL signals in which the sampling frequency is offset from a multiple of line frequency by half the line frequency. If there is no line-to-line variation of the luminance signal, then the first-order spectrum centered on the sampling frequency has components which symmetrically interleave with those of the unsampled signal spectrum, and may thus be distinguished. Where there does exist line-to-line variation the interleaved first-order spectrum interacts with the primary spectrum in a reduced manner due to the combing action. This is shown at (a) in FIG. 5, where the full line shows the primary spectrum (compare (a) in FIG. 4) and the dashed line shows the folded first-order spectrum. This reduction of the interference is likewise applied to the chrominance spectrum, which is shown at (b) in FIG. 5.

The sampling action of the two ADCs 18 and 20 must be related in phase if the analogue output N.T.S.C. signal of FIG. 1 is to be similar to the input signal.

After passing through the converter pairs 18, 20 and 26, 28 in FIG. 1, the resultant analogue signals are applied to the filtering unit 32, shown in more detail in FIG. 2 at (b). The purpose of this unit is to combine the luminance and chrominance signals with their residual interfering signals in such a way as to reproduce the original composite signal at input 10, the residual interference signals having cancelled each other. To this end a halving subtractor 50 is connected to the terminals 34 and 36 and applies its output through a band pass filter 52 covering the chrominance band, and similar to filter 44, to the inversion input of a subtractor 54 and to a one-line delay 56 the output of which is applied to an adder 58. The non-inversion input of subtractor 54 receives the luminance signal from terminal 34 via an equalising delay 60, and the subtractor output is applied to the other input of the adder 58.

It will be seen that in the unit 12 the one-line delay is in the luminance path whereas in the unit 32 it is in the chrominance path. An alternative rearrangement is possible in which the delay is in the chrominance path in the unit 12 and the luminance path in unit 32.

The lowest sub-Nyquist sampling frequency which can be used for the output of filtering unit 12 is that which allows the maximum overlap of the primary and first-order spectra. From (a) in FIG. 4 this is $f_B+f_V$, where $f_B$ is the lower cut-off frequency of the band-pass filter. If the output of filter $F_{12}$ is to represent an adequate chrominance signal, the bandwidth of the band-pass filter 44 must be at least large enough to pass all the Q signal. Thus $f_B$ is not greater than $2f_{sc}-f_v$, and so the sub-Nyquist sampling frequency can be $2f_{sc}$.

The exact value of $2f_{sc}$ is, however, unsatisfactory because it is a multiple of line frequency, as discussed above. Such a frequency nevertheless has advantages because it can effectively demodulate the chrominance signal emerging from $F_{12}$ to provide samples of I and Q, and is thus desirable from this point of view.

In accordance with this invention the conflicting requirements are met by using a sampling frequency having a mean value of $2f_{sc}$, but by perturbing its phase so that it has the spatial structure of a continuous frequency which has a half line-frequency offset.

Reference is now made to FIG. 6. In diagram (a) are diagrammatically shown the sampling sites on portions of four time-successive lines of one field which would arise if an N.T.S.C. signal were sampled at $2f_{sc}$. The sampling sites are in the same positions on every line. Contrasted with this, diagram (b) shows the sampling sites which occur when a phase perturbed signal which we term $2\hat{f}_{sc}$ is used to sample the signal. The sampling sites are horizontally interleaved on alternative lines by introducing a perturbation of one quarter of a subcarrier period between each pair of lines.

It can be shown by the use of two-dimensional spatial Fourier transforms, that the essential spectral properties of signals sampled with such a structure are identical to those of signals sampled with a continuous half-line offset frequency.

Consideration will now be given to the sampling of the output of filter $F_{12}$ to produce a chrominance signal. It can be shown that the bandpass signal at the output of filter $F_{12}$ may be sampled, at any frequency which is an even sub-multiple of $2\hat{f}_{sc}$ providing it is greater than $(f_v-f_B)$, may be low-pass filtered, and may be remodulated onto a carrier of frequency $\hat{f}_{sc}$ to give a result which is indistinguishable from sampling at $2\hat{f}_{sc}$. In this context, the term sub-multiple applies to both horizontal and vertical components of the sampling frequency, expressed two dimensionally. In particular, therefore, a sampling frequency of $\hat{f}_{sc}$ may be used, of which there are two possible forms as shown at (c) and (d) in FIG. 6.

Figure 7:
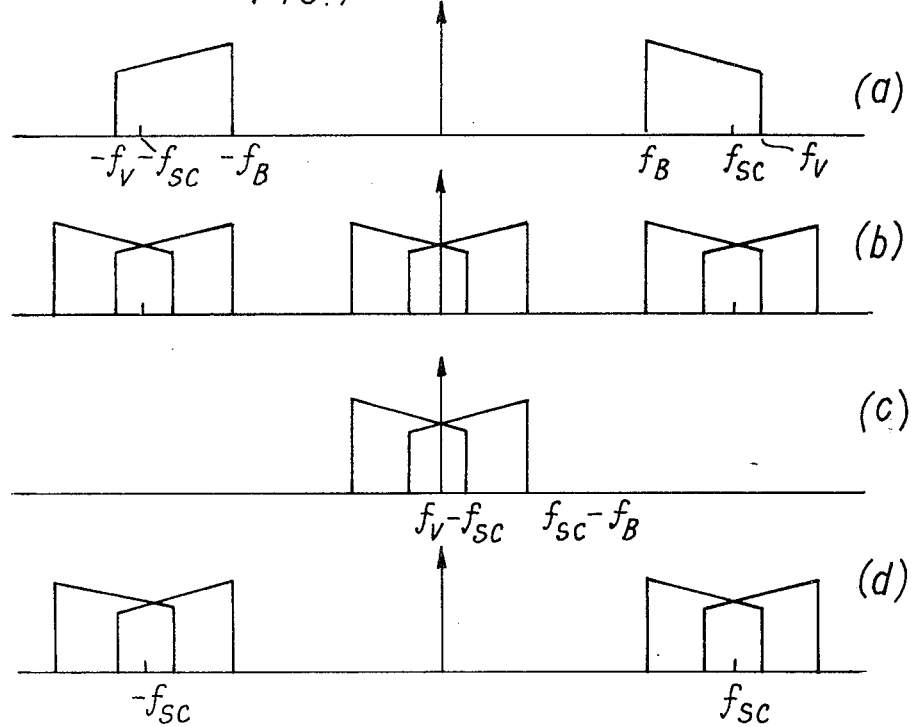
FIG. 7 (comprised of a, b, c and d) illustrates (in terms of the spectral components) how the $2\hat{f}_{sc}$ sampled bandpass signal is recreated.
Figure 8:
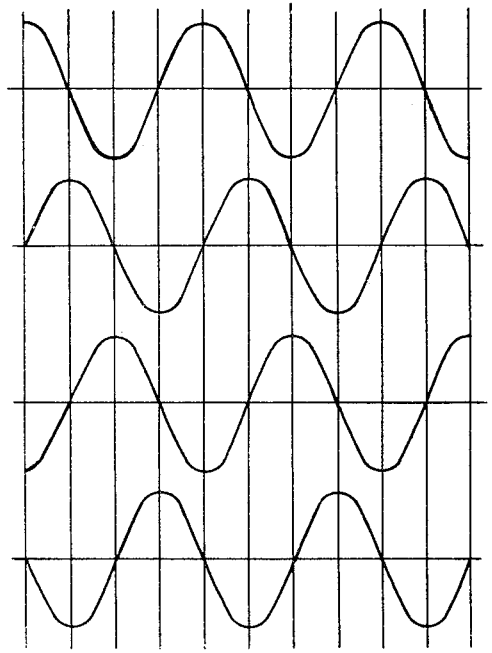
FIG. 8 shows the $\hat{f}_{sc}$ waveform.

FIG. 7 illustrates, on a one-dimensional basis, how the $2\hat{f}_{sc}$-sampled bandpass signal is recreated. The original signal spectrum, shown at (a), is sampled at a frequency of $\hat{f}_{sc}$ to give a spectrum as shown at (b). After low-pass filtering, shown at (c), remodulation on a carrier of frequency $\hat{f}_{sc}$ produces the spectrum of (d) in FIG. 7, which is equivalent to sampling the spectrum of (a) at $2\hat{f}_{sc}$. The carrier frequency $\hat{f}_{sc}$ is interpreted as a sine-wave of frequency $f_{sc}$ with discontinuities during the line-blanking interval such as to give waveforms on successive lines as shown in FIG. 8, analogous to diagram (c) in FIG. 6.

It can also be seen from FIG. 7 that sampling an N.T.S.C. signal can be achieved by analogue multiplication followed by simple addition. A signal such as at (c) if sampled at $f_{sc}$ produces a spectrum as at (b), with the spectrum components which were originally at the origin repeated indefinitely at multiples of $f_{sc}$. Multiplication of the signal at (c) however, produces the waveform at (d), which if added back to (c) is identical to (b) over the frequency range of interest.

The nature of the phase perturbations to the $2f_{sc}$ and $f_{sc}$ structures to give the $2\hat{f}_{sc}$ and $\hat{f}_{sc}$ structures respectively are such that if they were to continue indefinitely the $2\hat{f}_{sc}$ structure would have a four-field periodicity and the $\hat{f}_{sc}$ structure would have an eight-field periodicity as shown in FIG. 9. However as the system has no 'memory' beyond two line periods, i.e. the output signal is a combination of only three adjacent lines of the input signal (and, ideally, is equal to the middle line), the structures need only hold from line to line. Then further discontinuities may be inserted between fields so as to produce any field-to-field relationship required, consistent with the condition that $\hat{f}_{sc}$ sites are coincident with $2\hat{f}_{sc}$ sites. Thus although the choice of the absolute phase of sampling does not affect the "transparency" of the system, the line-to-line phase relationship must hold for a given field.

The absolute phase of sampling does however govern the nature of the chrominance samples. FIG. 10 shows the chrominance waveforms at the output of filter $F_{12}$ on four successive lines corresponding to a uniformly coloured area. The sampling instants corresponding to the $\hat{f}_{sc}$ structure (c) of FIG. 6 are also shown, where the angular delay from the peak of the Q carrier on the first line is θ. The sample values as functions of θ obtained on each line are indicated.

There are four special cases of interest which result in line-by-line sequences as follows:

(1) $\theta=0°$, sequence Q, I, −Q, −I
(2) $\theta=45°$, sequence $(Q-I)/\sqrt{2}$, $(Q+I)/\sqrt{2}$, $-(Q-I)/\sqrt{2}$, $-(Q+I)/\sqrt{2}$
(3) $\theta=33°$, sequence U, V, −U, −V
(4) $\theta=78°$, sequence $(U-V)/\sqrt{2}$, $(U+V)/\sqrt{2}$, $-(U-V)/\sqrt{2}$, $-(U+V)/\sqrt{2}$ U and V are defined on FIG. 10, and correspond to the PAL chrominance signals. The choice of sequence will be governed by operational considerations.

The filters $F_{11}$, $F_{12}$, $F_{21}$ and $F_{22}$ comprised in filter units 12 and 32 may be realised in digital form, which allows the system input and output to be in digital form. For this to be so, however, the sampling frequency must be $4f_{sc}$ although the digital filters are clocked at only $2f_{sc}$.

Figure 11:
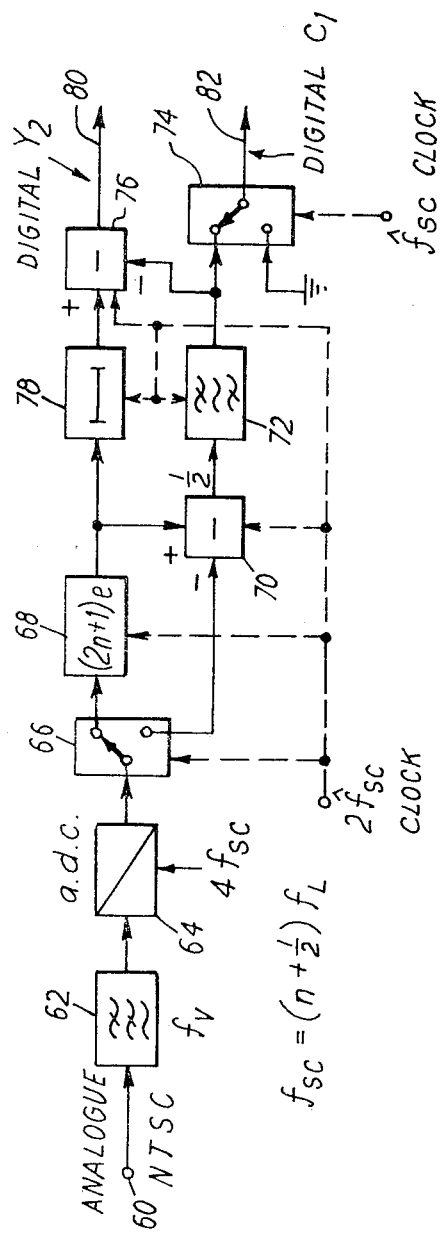
FIG. 11 is a block diagram of a sampling system using a digital comb filter.

FIG. 11 shows a system of such a type. An analogue N.T.S.C. signal is received at an input 60 and low-pass filtered in a filter 62. The filter has a cut-off frequency equal to the maximum nominal video frequency component, $f_v$. The filtered signal is sampled at $4f_{sc}$ in a digitiser 64, so that assuming $f_{sc}$ is equal to $(n+\frac{1}{2})f_L$ there are $4n+2$ samples on each line. The $4f_{sc}$ samples thus generated are applied alternately by a switch 66 to a $(2n+1)$ element or one line delay device 68 and to the inversion input of a halving substractor 70, the non-inversion input of which receives the output of the delay device 68. The subtractor output is band-pass filtered in a filter 72, and the filter output is applied to a switch 74 and to the inversion input of a subtractor 76 which also receives the output of the delay device 68 after it has passed through a compensating delay 78. The switch 66, delay device 68, subtractors 70 and 76, filter 72 and delay 78 are all clocked at $2f_{sc}$. In this way luminance signals sampled at $2f_{sc}$ are obtained at the output 80 of subtractor 76, and chrominance signals sampled at $2f_{sc}$ are obtained at the output of the filter 72. Alternate ones of the chrominance samples are then selected by the switch 74 to give chrominance samples at the correct sampling rate of $f_{sc}$ on an output 82.

Figure 12:
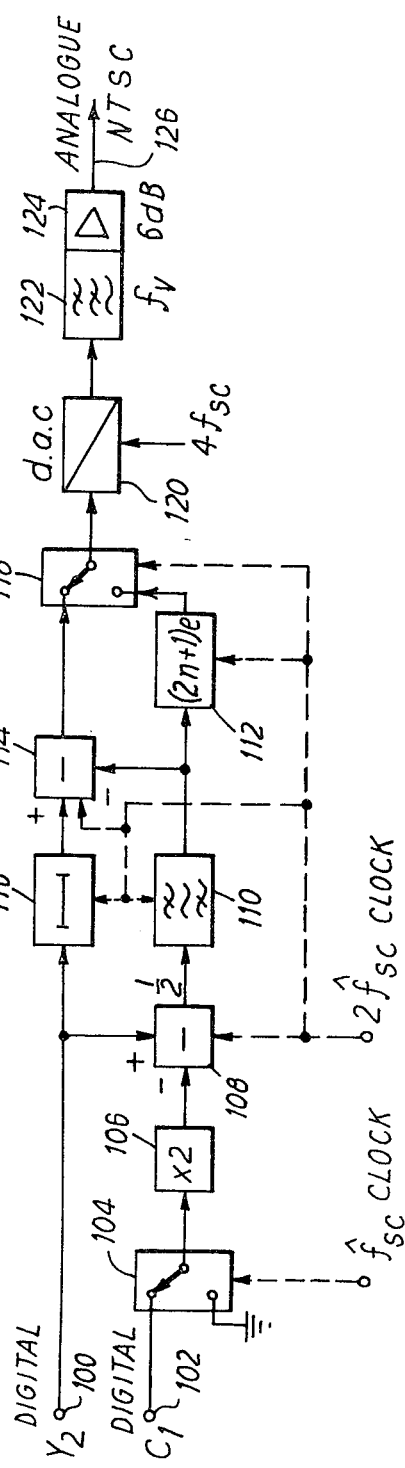
FIG. 12 is a block diagram of a system for regenerating an analogue signal and also using a digital filter.

The receiving end of the system is shown in FIG. 12. Here the $Y_2$ luminance signal sampled at $2f_{sc}$ is received at an input 100 and the $C_1$ chrominance signal sampled at $f_{sc}$ is received at an input 102. A switch 104 first doubles the sample rate of the chrominance signal by inserting alternate zero-value samples between the $f_{sc}$ samples. The samples values must also be doubled in a doubler 106 to allow for the dilution caused by this doubling of rate. After this the chrominance signal can be clocked at a rate of $2f_{sc}$, as well as the luminance signal. The output from the doubler 106 is subtracted from the luminance input 100 in a halving subtractor 108 and the resultant is filtered in a bandpass filter 110 covering the chrominance band. The filtered signal is applied both to a $(2n+1)$ element delay device 112 and to the inversion input of a subtractor 114 which also receives the luminance input after being delayed in an equalising delay 116. A switch 118 alternately selects samples from the subtractor 114 and the $(2n+1)$ element delay device 112 so as to produce a $4f_{sc}$-sampled signal, which is fed to a DAC 120 which is clocked at the same rate. The DAC 120 is assumed to include a sample-and-hold circuit for producing a boxcar waveform and a boxcar distortion equaliser. An analogue low-pass filter 122 with cut-off at the maximum video frequency $f_v$, and which could be an integral part of the DAC, is present to eliminate the spectral energy centred on $2f_{sc}$. An amplifier 124 with a gain of 6dB is also necessary to offset the loss caused by the $2f_{sc}$ to $4f_{sc}$ conversion. An analogue N.T.S.C. output signal then appears on line 126.

If a digital output sampled at $4f_{sc}$ is required, then the DAC 120 is omitted, and the low-pass filter 122 and amplifier 124 are realised in digital form at a clock frequency of $4f_{sc}$. Similarly, in FIG. 11, digital input signals can be received if the ADC 64 is omitted and the filter 62 is a digital filter.

In this way a $4f_{sc}$ sampled N.T.S.C. signal is transcoded into a luminance/chrominance form at a total sample rate of $3f_{sc}$ and back into a $4f_{sc}$-sampled form. The precise nature of the chrominance samples will be dictated by the sampling phase used in the generation of the initial digital N.T.S.C. signal.

The usefulness of such an arrangement is, firstly, that it is expected that $4f_{sc}$ sampling of N.T.S.C. will become a standard in digital N.T.S.C. studios, but this $4f_{sc}$ sample rate is unnecessarily high for transmission purposes and too high for current digital recorder technology. Secondly, the luminance-chrominance signals generated by the method constitute a common "currency" for the exchange of programmes, e.g. internationally, and improved forms of coding. Thirdly, some forms of video signal processing, notably visual effects, are more easily carried out on luminance-chrominance signals than on the composite signal.

As far as the first of these points is concerned, the system described is an alternative to interpolating the $4f_{sc}$-sampled composite signal to provide samples of the composite signal at a $3f_{sc}$ rate. Unless such an interpolator is perfect, i.e. takes an infinite number of samples into account, impairments result which must be compared with those that result from the imperfection of the bandpass filters in the above method. It is thought likely that the impairments of the illustrated system would be preferable.

As far as the second and third points are concerned, it depends on whether or not component signals (i.e. luminance and colour difference signals) ultimately become the working signals in a digital system. It follows therefore that it is important to know how to derive the luminance-chrominance signals from component signals, and equally how to reverse the process. There are, then, two further routes, namely YIQ to $Y_2/C_1$ and $Y_2/C_1$ to Y'I'Q' to be considered.

FIG. 13 shows these routes. The bottom part of the figure, namely the N.T.S.C. to N.T.S.C. path, is constituted by FIG. 1. The top part corresponds to the two additional routes. It will be noted that in these routes the luminance (Y) path is identical to that in the bottom path (N.T.S.C. to N.T.S.C.), were the chrominance path absent. Thus the manner in which the luminance is comb-filtered, sampled and reconstituted is identical to that given above. However, there is also a difference in that the chrominance (I, Q) path of the N.T.S.C. to N.T.S.C. route carries the signals which cancel the luminance impairments caused by the comb filtering and sampling. Thus the luminance component of the N.T.S.C. signal undergoes no overall impairment in the N.T.S.C. to N.T.S.C. route. In the Y to Y' route the luminance and chrominance paths do not interact and so the chrominance path cannot carry the signals which compensate the luminance impairments. As a result the Y' obtained at the output suffers from residual aliasing, maximally at the ¼ line offset frequencies, and loss of diagonal resolution as shown by the spectrum in FIG. 14. These impairments are the familiar ones associated with sub-Nyquist sampling of the composite PAL signal and the PAL signal $Y_2$, $(U \pm V)$ system which are the subject of out British Pat. Nos. 1,534,268-270.

The chrominance paths of the YIQ to $Y_2/C_1$ and $Y_2/C_1$ to $Y'I'Q'$ routes will now be considered. It will be recalled that the $C_1$ signal consists of samples at a rate of $\hat{f}_{sc}$ with a definite spatial structure and having the line-to-line values A, B, $-$A, $-$B, A . . . ; in this, A is the quantity $Q \cos \theta - I \sin \theta$ and B is the quantity $Q \sin \theta + I \cos \theta$, where Q and I are the instantaneous values of the N.T.S.C. colour difference signals and $\theta$ is an arbitrary angle governed by the phase of sampling. It is thus the function of the filter marked $F_3$ in FIG. 13 to produce these signals from I and Q inputs, and likewise the function of the filter $F_4$ to recover the I and Q signals from the signals A, B, etc.

FIG. 15 shows an example of a circuit which can be represented by filter $F_3$. The input signals I and Q are first prefiltered by averaging across 1-line delays 15, 16 by halving adders 7, 8 to lower their vertical bandwidths for reasons which will become apparent. The two signals A and B referred to above are then formed by multipliers 1 to 4, subtractor 5 and adder 6, and switch S1 selects them on alternate lines. Switch S2 then selects the inverted output of switch S1 on alternate line pairs, i.e. switch S2 changes state after every second line. As mentioned above, the nature of the samples is determined by the value of $\theta$, and, for example, with $\theta$ equal to zero the line-by-line sequence, Q, I, $-$Q, $-$I, . . . is produced. It will be appreciated that in such a case the multipliers 1 to 4, subtractor 5 and adder 6 could be omitted, and the A and B inputs to S1 taken from the Q and I averagers 7 and 8 respectively. It will also be appreciated that other circuit rearrangements are possible so as to produce the line-by-line sequence A, B, $-$A, $-$B at the output.

Figure 16:
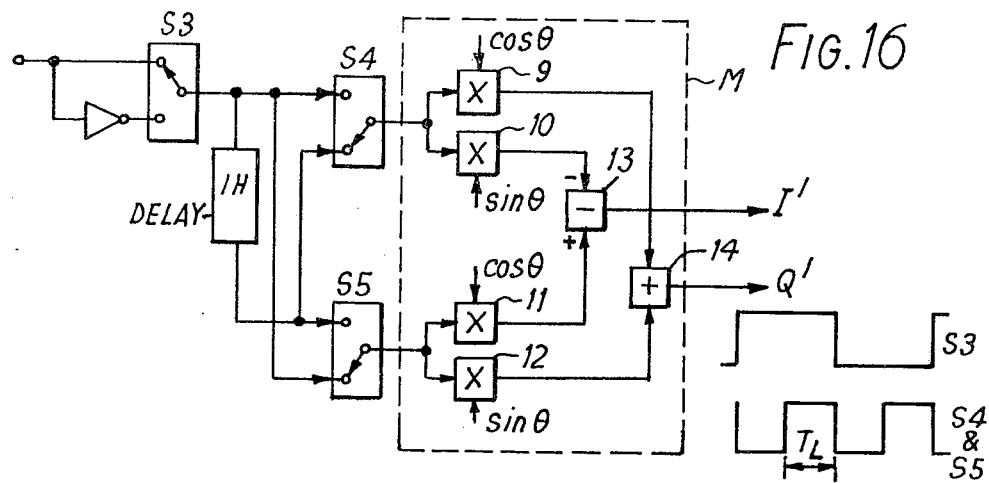
FIG. 16 is a circuit diagram of a post-filter unit for use in the system of FIG. 13.

FIG. 16 shows an example of a circuit which can be represented by filter $F_4$. The input line-by-line sequence is first inverted on alternate line pairs by an inverter and switch S3 so as to produce the sequence A, B, A, B, . . . Then a one-line delay provides access to A and B simultaneously so that I and Q can be formed. The matrix equation giving A and B in terms of I and Q is:

$$\begin{bmatrix} A \\ B \end{bmatrix} = \begin{bmatrix} \cos\theta & -\sin\theta \\ \sin\theta & \cos\theta \end{bmatrix} \begin{bmatrix} Q \\ I \end{bmatrix}$$

This equation can be inverted to yield I and Q in terms of A and B. The result is:

$$\begin{bmatrix} Q \\ I \end{bmatrix} = \begin{bmatrix} \cos\theta & \sin\theta \\ -\sin\theta & \cos\theta \end{bmatrix} \begin{bmatrix} A \\ B \end{bmatrix}$$

Thus Q and I are both given by linear combinations of A and B which are available at the input and output of the one-line delay. Switches S4 and S5 operate as a change-over switch enabling the roles of delay input and output to be reversed as fresh values of A and B enter alternately.

As before, if, for example, $\theta$ equals zero, the illustrated multipliers 9, 10, 11 and 12, subtractor 13 and adder 14 could be omitted and the Q and I outputs taken from the outputs of switches S4 and S5 respectively. It will be appreciated that other circuit rearrangements are possible so as to produce the outputs $(A \cos \theta + B \sin \theta)$ and $(-A \sin \theta + B \cos \theta)$ from the input sequence A, B, $-$A, $-$B, A . . . .

If there were no line-to-line variations in the I and Q signals then they would be recovered perfectly from the composite chrominance signal C in traversing the route YIQ to $Y_2/C_1$ to $Y'I'Q'$ of FIG. 13, i.e. $Q'=Q$ and $I'=I$. Then the I and Q prefilters comprising the delays 15 and 16 and averagers 7 and 8 of FIG. 15 would be unnecessary. However, where there are line-to-line variations the reduction of the two signals to one signal results in "self-aliasing" and cross-talk, which are mitigated by the action of the prefilters. In particular if $\theta$ equals zero no I/Q cross-talk occurs but the self-aliasing of I and Q is maximal. On the other hand when $\theta$ equals 45° no self-aliasing occurs but the I/Q cross-talk is maximal.

Figure 17:
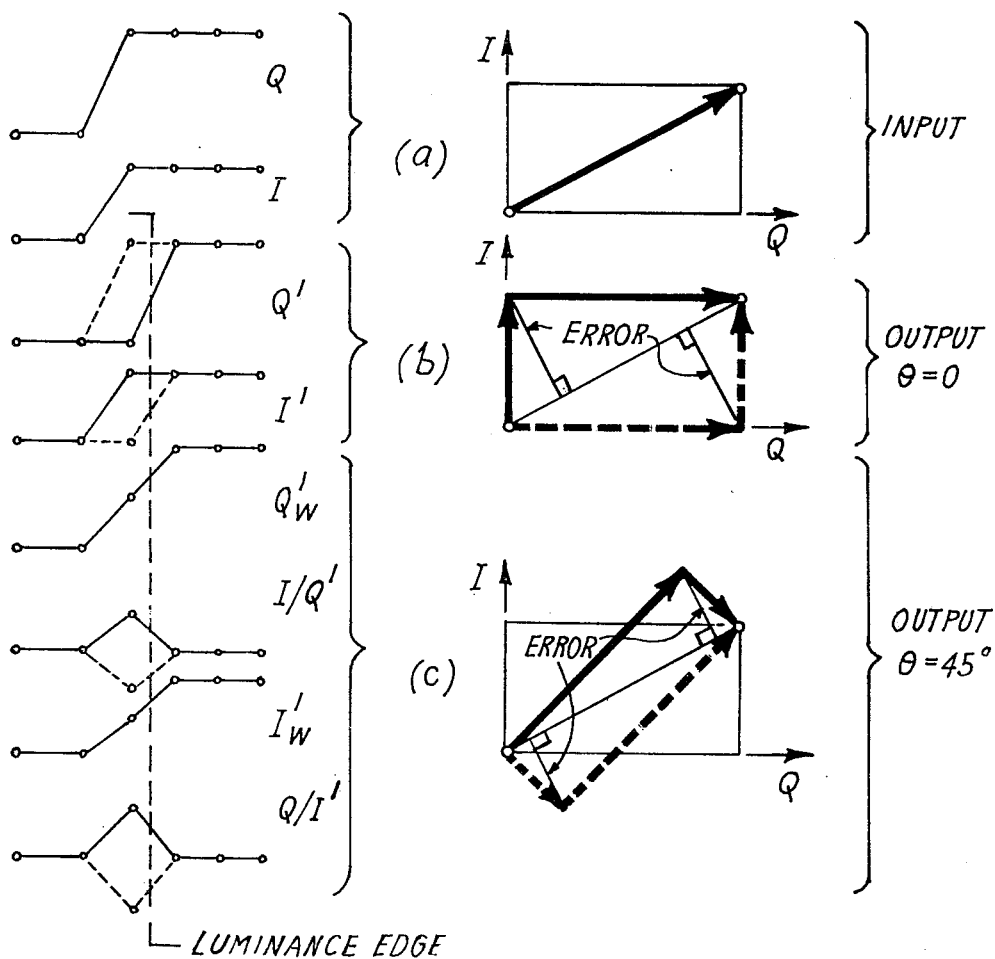
FIG. 17 (comprised of a, b and c) illustrates the chrominance response of the system of FIG. 13 to a horizontal chrominance edge without pre-filtering.

FIG. 17 shows the chrominance response of the system to a horizontal chrominance edge without chrominance pre-filtering. At (a) is shown the input I and Q waveforms and the vector representation, assuming that both components change. At (b) and (c) are shown respectively the two cases of $\theta$ equal to zero and 45°. In the first case the self-aliasing appears as a misregistration of one of the components from the true position indicated by the position of the output luminance component which is delayed by one line. This differential misregistration produces an intermediate hue which is not, in general, in the same direction as the transition vector and therefore causes an error. The worst case occurs when the transition vector is parallel or perpendicular to the bisector of the I and Q axes.

In the second case the wanted components of the signal transitions are both softened and misregistered by half a line pitch, but now the I/Q cross-talk introduces a further unwanted component into each signal. This again produces an intermediate hue which is not, in general, on the transition locus. The worst case now occurs when the transition vector is parallel to either the I or Q axis.

Moreover if the $\hat{f}_{sc}$ structure has an eight-field periodicity, as shown in FIG. 9, the misregistration error at (b) in FIG. 17 and cross-talk error at (c) alternate in successive pictures, as shown by the dotted lines. This causes a hue flicker at half the picture frequency.

The addition of the I and Q prefilters reduces these effects at the expense of further softening the vertical transient response, as shown in FIG. 18. As in FIG. 17, the input is shown at (a) and the cases of $\theta$ equal to zero and 45° are shown at (b) and (c). As can be seen there is now no misregistration for either case, and the hue error is halved.

The half-picture-frequency flicker of the hue error can be avoided by further perturbing the $\hat{f}_{sc}$ structure in the field-blanking as mentioned above so as to obtain identical sample values of a uniform-coloured area in successive pictures. However, the resulting 4-field-repetitive $\hat{f}_{sc}$ structure (comprising, say, the sites 0, 4, 3 and 7 in FIG. 9) would require a 2-field-repetitive $2\hat{f}_{sc}$ structure for the Y signal following the condition that $\hat{f}_{sc}$ sites must be coincident with $2\hat{f}_{sc}$ sites. This, in turn, would cause the Y alias components to appear stationary. It can be argued that stationary luminance and chrominance alias and cross-talk components are beneficial, since they do not distract the eye as much as if they were moving at half the picture frequency. However, they are revealed if objects move at all, and moreover their stationary character on stationary objects makes it impossible to eliminate them by field-to-field processing. Thus, on balance, it is the inventors' belief that the eight and four field periodicites for the $\hat{f}_{sc}$ and $2\hat{f}_{sc}$ structures are preferable. Thus the half-picture-frequency flicker on horizontal chrominance edges is a price which has to be paid for condensing the I and Q signals into a single chrominance signal, with the possibility of eliminating the flicker using more complex processing.

As described above, it is possible to implement the processing carried out by filters $F_3$ and $F_4$ digitally, so that the YIQ signals may be presented and recovered in digital form. The digital implementation of the filters $F_{11}$ and $F_{21}$ has already been illustrated in FIGS. 11 and 12 and has been shown to require a $4f_{sc}$-sampled input and output, although the filters themselves may be clocked at $2\hat{f}_{sc}$. In the same way the filters $F_3$ and $F_4$ may accept or deliver, respectively, $4f_{sc}$-sampled signals with the whole of the processing described in FIGS. 15 and 16 operating at a clock frequency of $4f_{sc}$. Then appropriate samples would be selected at the output of filter $F_3$ corresponding to the $\hat{f}_{sc}$ structure and zero valued samples would be inserted at the input of filter $F_4$ to restore the $4f_{sc}$ sample rate. Alternatively, filter $F_3$ and part of filter $F_4$ could operate at a clock frequency of $\hat{f}_{sc}$.

Figure 20:
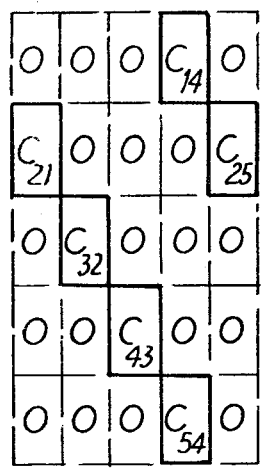
FIG. 20 defines the selected chrominance samples.

FIG. 19 shows a subscript convention for $4f_{sc}$ input I and Q samples and indicates which samples contribute to each chrominance sample selected at the output of filter $F_3$. The selected chrominance samples have arbitrarily been designated $C_{14}, C_{18} \ldots C_{21}, C_{25} \ldots C_{32}, C_{36}, \ldots$ etc. as shown in FIG. 20 and it can be seen from FIG. 19 that half the $4f_{sc}$ I and Q samples are not used. Of the remaining half, one half contribute to chrominance samples in the current line and the other half to samples in the following line. If, therefore, only these latter input samples are stored, the whole of the processing may be carried out at a clock frequency of $\hat{f}_{sc}$.

Figure 21:
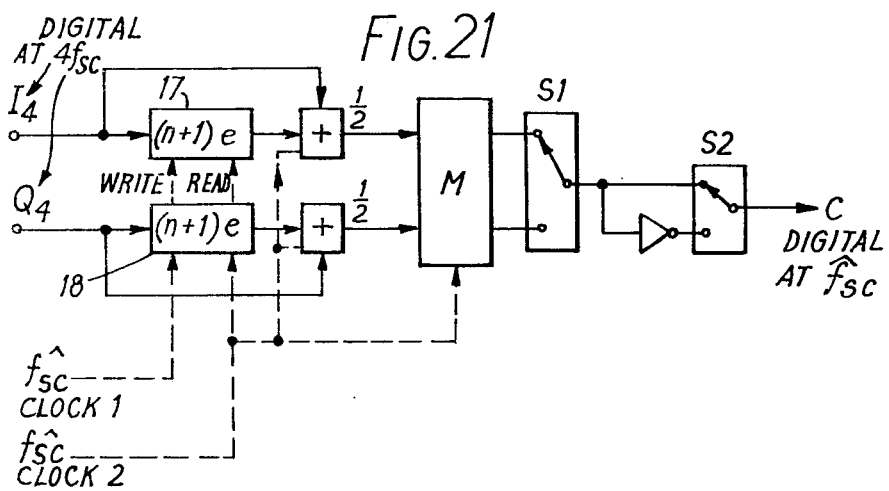
FIG. 21 is a block diagram of a digital system for converting I and Q to $C_1$ using a clock of $\hat{f}_{sc}$.

FIG. 21 shows such an arrangement. Assuming that the subcarrier frequency is equal to $(n+\frac{1}{2})f_L$ the line delays 15 and 16 of FIG. 15 become $(n+1)$ element stores 17 and 18. Two $\hat{f}_{sc}$ clocks are used, one for writing into the stores and the other for reading out of the stores and clocking the rest of the processing. The write clock lags the read clock by one $4f_{sc}$ sample period, so ensuring that the stored samples are spatially delayed with respect to the direct samples appropriate to the pattern of FIG. 19. For example, $Q_{21}$ is used directly, $Q_{22}$ is stored and $Q_{23}$ and $Q_{24}$ are ignored.

Figure 22:
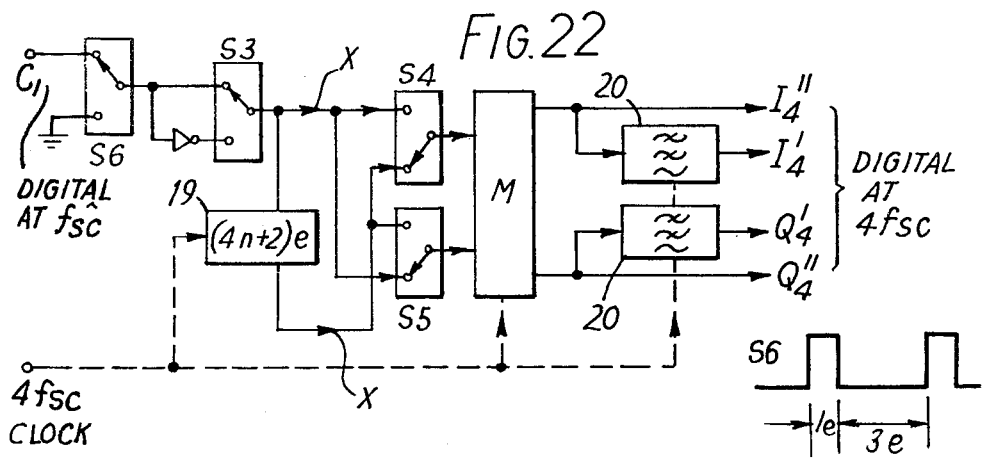
FIG. 22 is a block diagram of a digital system for converting $C_1$ to I and Q.

Turning to the digital implementation of filter $F_4$, FIG. 22 shows a digital circuit operating at a clock frequency of $4f_{sc}$ which is the equivalent of the analogue circuit of FIG. 16 plus the effect of the DAC postfilter. The sample rate of the incoming $C_1$ samples is first increased to $4f_{sc}$ by switch S6 which inserts three zero valued samples between $C_1$ samples. In this way the spectral properties of the $C_1$ samples are unaltered. Thereafter the processing proceeds at a sample rate of $4f_{sc}$, so that the one-line delay of FIG. 16 becomes a $(4n+2)$ element digital store 19. Digital low pass filters 20 cutting at $\frac{1}{2}f_{sc}$ are needed to simulate the action of the DAC postfilters so that the signals $I_4'$ and $Q_4'$ are approximate representations of the signals $I'$ and $Q'$ of FIG. 16, sampled at $4f_{sc}$. Alternatively, the input to the filters 20, namely $I_4''$ and $Q_4''$, may constitute the output, in which case the filters may be omitted. Although the signals $I_4''$ and $Q_4''$ are very unlike $I_4'$ and $Q_4'$, they can be transformed back into $C_1$ samples with, in principle, no degradation.

The amount of storage required in the arrangement of FIG. 22 may be reduced. To show this and the nature of the $I_4''$ and $Q_4''$ samples, the sample structures and values must be examined. FIG. 20 shows the structure of the incoming $C_1$ samples after the sample rate has been increased to $4f_{sc}$. As each $I''$ or $Q''$ sample is a linear combination of two $C_4$ samples separated by one-line period, FIG. 20 shows that half the $I''$ and $Q''$ samples are zero. Of the remaining half, one half are derived from the non-zero $C_4$ samples on the current line and the other half from non-zero samples on the preceding line. This has the effect of producing $I''$ and $Q''$ structures as shown in FIG. 23 where the mathematical relationships between $I''$, $Q''$ and C samples are also shown. It will be noted that only one new value per horizontal quadruplet is produced as vertically adjacent samples are equal. For example, $Q_{24}''$ equals $Q_{14}''$. This being so, the operation of sample rate augmentation performed by switch S6 may be moved to the two points marked X in FIG. 22 so that the store 19 need only contain the incoming $C_1$ samples. This reduces its capacity to $(n+1)$ elements, but it now requires separate write and read clocks of frequency $\hat{f}_{sc}$ with the write clock lagging the read clock as in FIG. 21.

FIG. 23 shows that the nature of the $I''$ and $Q''$ sample is such that, in general, pairs of non-zero values occur between pairs of zero values. In particular, if $\theta$ equals zero, only every fourth sample is non-zero. Thus the $I''$ and $Q''$ samples have strong spectral components centred on multiples of $\hat{f}_{sc}$ which must be rejected by the filters 20 if they are to represent the original $I_4$ and $Q_4$ signals. However, as previously mentioned, the $I''$ and $Q''$ samples may be regarded as a secondary standard which can be substituted for the $I_4$ and $Q_4$ samples insofar as they produce identical C samples when fed into the inputs of the circuit of FIG. 21.

A system which receives a signal, of a certain format, processes it and eventually produces an output, and in which the output signal is essentially indistinguishable for practical purposes from the input signal, is referred to as "transparent". The "transparency" of the C to $I''/Q''$ to C path may be demonstrated as follows. Firstly the structure of the non-zero $I_4''$ and $Q_4''$ samples in FIG. 23 is identical to the structure of the relevant $I_4$ and $Q_4$ samples in FIG. 19 but shifted vertically by one line. This implies that for transparency the structure of the C resampling, designated $C''$, should be as in FIG. 20 but also shifted vertically in the same way as shown in FIG. 24. Secondly FIGS. 23 and 24 shows that each $C''$ sample is composed of vertically adjacent non-zero $I''$ and $Q''$ samples which are respectively equal. Thus the vertical averaging of the input samples performed by stores 17 and 18 with their respective adders has no effect. Then, for example:

$$C_{31}'' = A_{21}'' = Q_{21}''\cos\theta - I_{21}''\sin\theta$$
$$= C_{21}\cos^2\theta + C_{21}\sin^2\theta$$
$$= C_{21},$$
and
$$C_{42}'' = B_{32}'' = Q_{32}''\sin\theta + I_{32}''\cos\theta$$
$$= C_{32}\sin^2\theta + C_{32}\cos^2\theta$$
$$= C_{32}.$$

In general, therefore, the C samples can, in principle, be recovered provided that the phases of the write and read clocks and the switches S1 and S2 in FIG. 21 are appropriate. This implies that signals in Y₄I₄"Q₄" form dictate the phases of the $\hat{f}_{sc}$ and $2\hat{f}_{sc}$ structures and the value of $\theta$.

The I₄' and Q₄' samples are more like the I₄ and Q₄ input samples in that they do not contain spectra centered on multiples of $\hat{f}_{sc}$ other than multiples of $4f_{sc}$, but they still contain the I/Q crosstalk and/or self-aliasing associated with the analogue I' and Q' signals. Thus for the path C to I'/Q' to C to be transparent, the phasing of the switches S1 and S2 must still be appropriate, but the horizontal filtering of the filters 20 removes the need for correct horizontal phasing of the C sample regeneration. This phasing is, however, influenced by the accompanying Y' signal. Finally, the transparency of the path C to I"/Q" to C depends only on the accuracy of the operations performed by M whereas the transparency of the path C to I'/Q' to C depends, in addition, on the quality of the filters 20. Thus the signals I₄" and Q₄" are to be preferred except when converting to analogue form.

Figure 25:
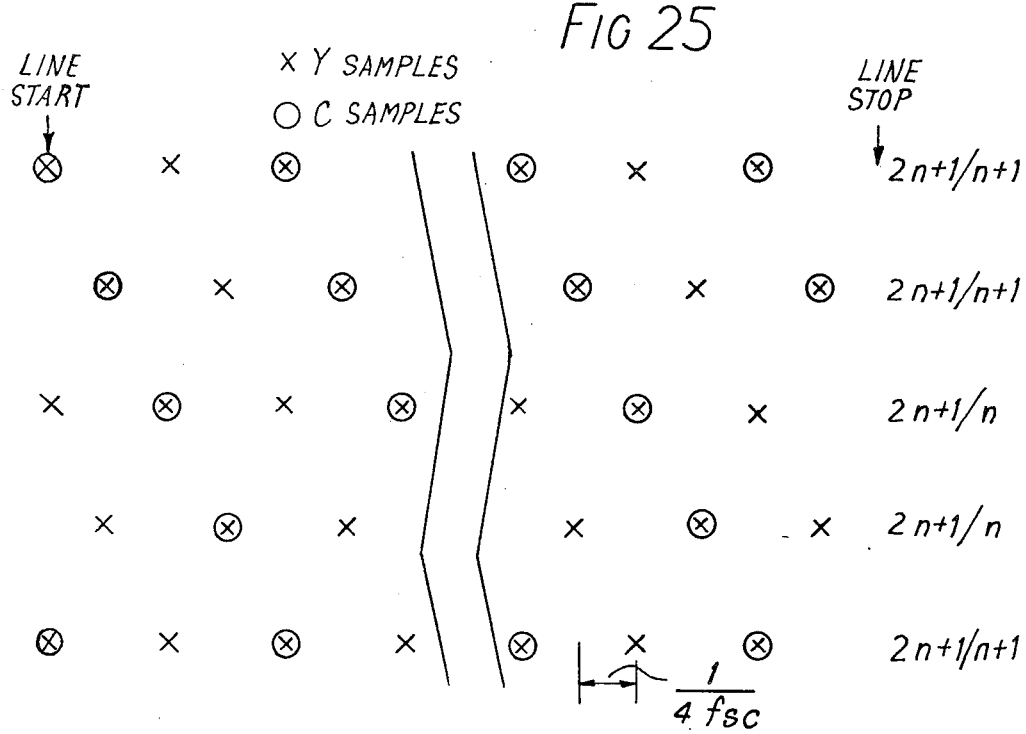
FIG. 25 illustrates the time positions of phase perturbed clock signals.

The generation of the phase-perturbed clock signals will now be described. FIG. 25 shows the spatial structure of the $2\hat{f}_{sc}$ and $\hat{f}_{sc}$ sample sites at the beginning and end of consecutive lines of a field. The line start has for convenience arbitrarily been made to coincide with a $2\hat{f}_{sc}$ site. Assuming that $f_{sc}=(n+\frac{1}{2})f_L$, the $2\hat{f}_{sc}$ structure is defined as such to give (2n+1) samples on each line. This implies that the discontinuity of clock period that occurs at the end of each line alternates between $\frac{1}{4}$ and $\frac{3}{4}$ of a subcarrier period. The $\hat{f}_{sc}$ structure is defined as giving (n+1) samples alternating with n samples on successive line pairs, the sites being coincident with $2\hat{f}_{sc}$ sites. The phase of the (n+1)/n alternation is such that the first line of (n+1) or n samples is that which has a $\frac{3}{4}$ subcarrier period clock period discontinuity in the $2\hat{f}_{sc}$ structure at its end, assuming the $\hat{f}_{sc}$ structure of FIGS. 6(c), 19, 20, 23, 24 and 25. If the alternative structure of (d) in FIG. 6 is assumed, then the (n+1)/n phasing is reversed with respect to the $2\hat{f}_{sc}$ structure. These definitions imply a discontinuity in $\hat{f}_{sc}$ clock period at the end of each line that takes the value $\frac{3}{4}$ subcarrier period for 3 consecutive lines followed by one of 7/4 subcarrier period.

Figure 26:
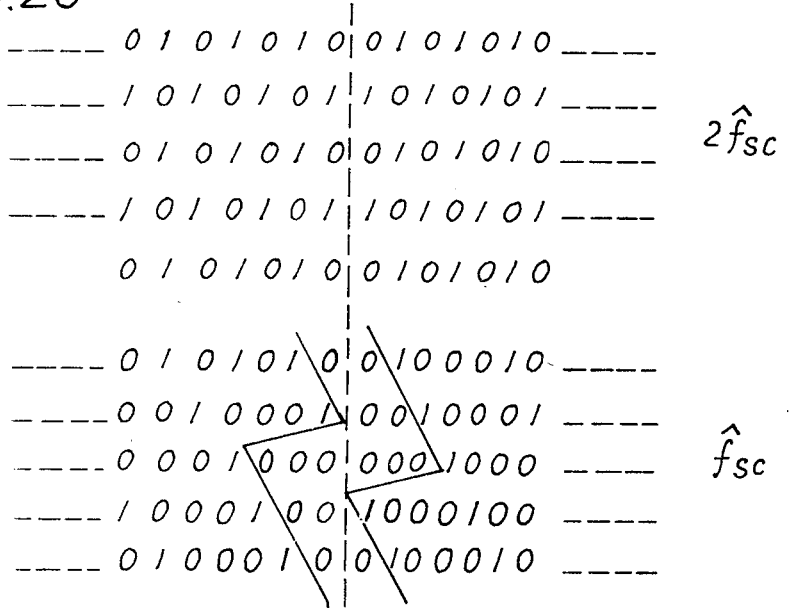
FIG. 26 illustrates the $2\hat{f}_{sc}$ and $\hat{f}_{sc}$ clock patterns.
Figure 27:
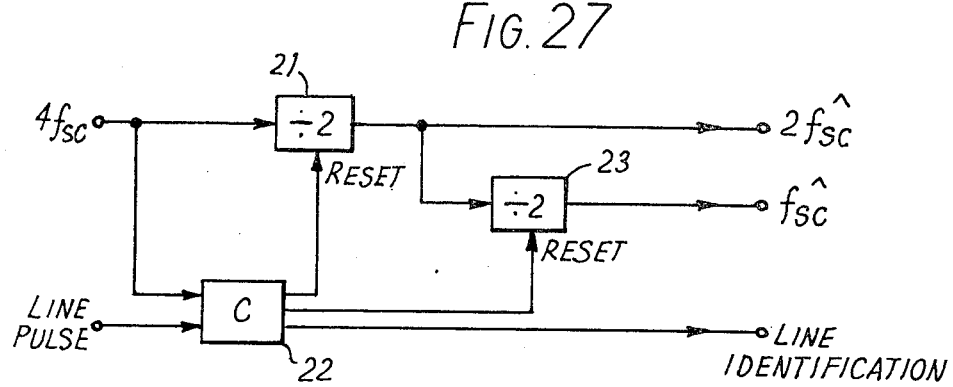
FIG. 27 shows circuitry for deriving the phase perturbed clock signals $2\hat{f}_{sc}$ and $\hat{f}_{sc}$ from a $4f_{sc}$ signal.

The behaviour of these discontinuities can be described in terms of a basic unit of time equal to one quarter of a subcarrier period. Using 1 for the presence of a clock pulse and 0 for its absence, the behaviour of the $2\hat{f}_{sc}$ and $\hat{f}_{sc}$ clock patterns over the line edge discontinuity is shown in FIG. 26. These clock patterns can be derived from a $4f_{sc}$ clock by suitable division, as shown in FIG. 27. A divide-by-two circuit 21 produces a clock at $2\hat{f}_{sc}$ and is reset into the opposite phase at the line edge, by a control signal produced by circuit 22. A further divide-by-two circuit 23 then produces a clock at $\hat{f}_{sc}$ and is appropriately reset by a further control signal produced by circuit 22. Finally, as the $\hat{f}_{sc}$ structure repeats after 4 lines, there are 4 different types of line which need to be identified for the purpose of control. Thus circuit 22 needs to produce such an identification signal.

The arrangement of FIG. 13 enables transcoding to take place between sources of YIQ or N.T.S.C. on the one hand and destinations of YIQ or N.T.S.C. on the other, any of which may be in analogue or digital form sampled at $4f_{sc}$. The intermediate Y₂/C₁ signals may be regarded as a format for digital transmission, digital studio distribution or digital recording, and are useful for transcoding to other colour systems. In particular it is also possible to construct a similar arrangement based on YUV or PAL sources and destinations having an intermediate Y₂/C₁ signal as described in our British Pat. Nos. 1,534,268–270. If, thereore, there exist two television colour systems having the same field and line standards, the one being an N.T.S.C. system and the other a PAL system, and if the colour subcarrier frequencies differ by nominally $\frac{1}{4}$ of line frequency, then it is possible to transcode between them in a very simple manner. Such a situation currently exists between the 525/60 N.T.S.C. system of the United States of America and the 525/60 PAL system used in Brazil.

It is possible to transcode between PAL and N.T.S.C. systems, under such conditions, by observing firstly that the luminance sampling structures will be nominally identical provided that the 4-field repetitive structure of FIG. 9 applies to the N.T.S.C. luminance. Secondly the chrominance sampling structures will be nominally identical provided that the 8-field repetitive structure of FIG. 9 applies to the N.T.S.C. chrominance. Thirdly, by choosing $\theta$ equal to 78° the chrominance line-by-line sequence, A, B, $-A$, $-B$ of the N.T.S.C. signal has A equal to $(U-V)/\sqrt{2}$ and B equal to $(U+V)/\sqrt{2}$ as noted above. Thus it is only necessary to invert the N.T.S.C. chrominance samples on alternate line pairs to give compatible PAL chrominance samples. This can be done by passing the N.T.S.C. chrominance samples through a switchable inverter controlled by a quarter-line-frequency square wave. Similarly the PAL chrominance samples may be converted to N.T.S.C. form by passing them through an identical circuit. Such chrominance transcoding from N.T.S.C. to PAL and back again or vice versa is completely transparent as it involves only inversion.

Figure 28:
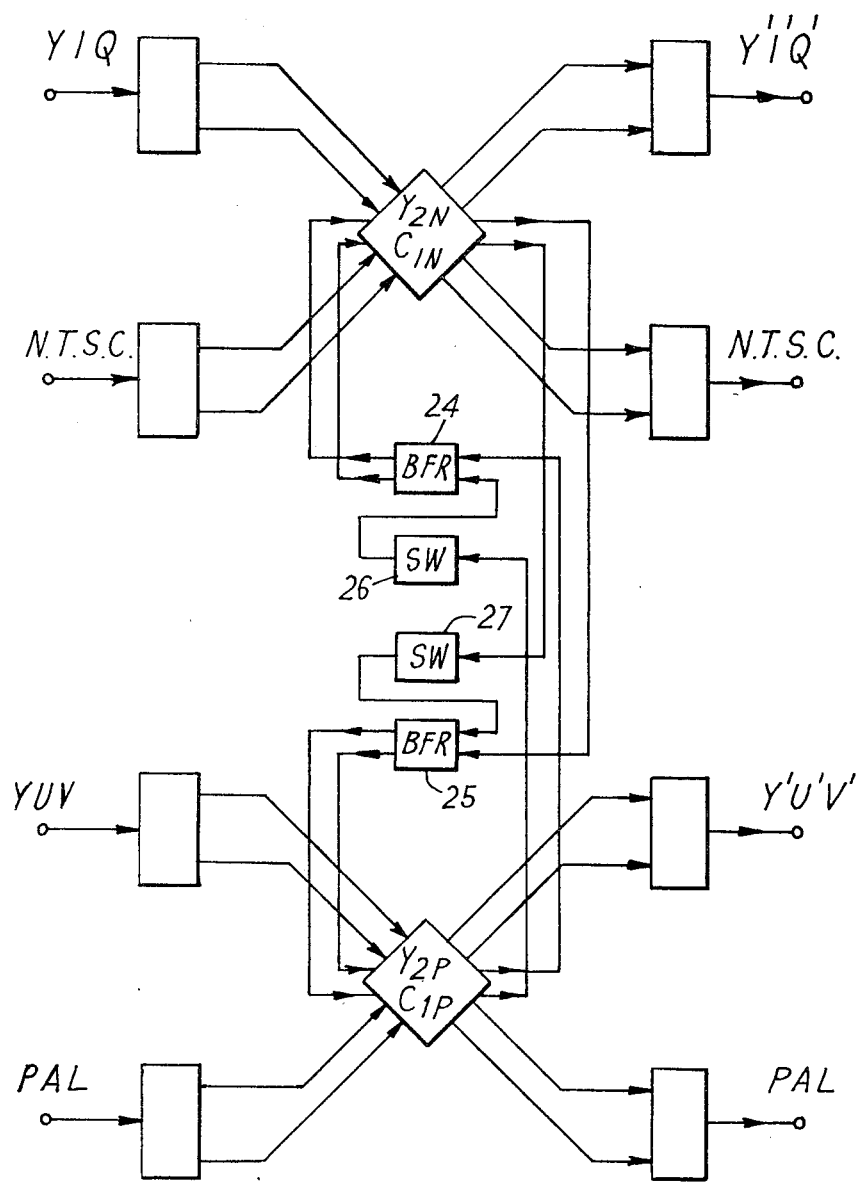
FIG. 28 shows a system for transcoding between PAL and N.T.S.C. systems via $Y_2/C_1$ signals.

FIG. 28 shows such a transcoding arrangement between PAL and N.T.S.C. systems of identical field and line standards and having subcarrier frequencies differing only by $\frac{1}{4}$ of line frequency. The Y₂/C₁ signals of the N.T.S.C. and PAL systems have been given the subscripts N and P respectively as they are not identical. Assuming that the PAL subcarrier frequency is approximately equal to $(n+\frac{1}{2}\pm\frac{1}{4})f_L$, there are $2n+1\pm\frac{1}{2}$ sampling intervals per line for the PAL Y₂ signal whereas there are 2n+1 intervals for the N.T.S.C. Y₂ signal. Thus the relative phasing of the two luminance sample patterns changes gradually across the line, the total accumulated difference being half a sampling interval. The phase perturbation of the N.T.S.C. sampling clock ensures that the relative phasing of the PAL and N.T.S.C. structures is correctly reset at the beginning of each line, so that the phase error does not accumulate beyond one line. However if the PAL subcarrier frequency has an additional picture frequency offset there is an additional accumulation of phase error down the field, amounting to one sampling interval. The same considerations apply to the chrominance signals.

These slight accumulations of phase error can be accomodated by using a buffer store which simply retimes the incoming sample values so as to occur at the correct output rate. This involves the loss or spurious generation of one sample value per line which can be arranged to occur in the blanking interval and which is therefore of no significance. Moreover the process is reversible as many times as necessary with no cumulative loss. This is the function of buffer stores 24 and 25 in FIG. 28. Similarly the chrominance inversion on alternate line pairs performed by switches 26 and 27 also involves no cumulative loss.

This lack of cumulative loss can be turned to advantage when considering the various routes through the system of FIG. 28. For example, the routes:

(a) N.T.S.C. to $Y_{2N}/C_{1N}$ to N.T.S.C.
(b) $Y_{2N}/C_{1N}$ to $Y_{2P}/C_{1P}$ to $Y_{2N}/C_{1N}$
(c) $Y_{2P}/C_{1P}$ to PAL to $Y_{2P}/C_{1P}$ are all "transparent" provided the bandpass filters are perfect. This being so, it is possible to generate composite PAL from composite N.T.S.C. and reverse the process transparently. Thus an analogue N.T.S.C. signal could be transformed into an analogue PAL signal for transmission over a link with poor differential phase and inversely transformed at the receiving end. The impairments introduced by the link would then appear as characteristic PAL rather than N.T.S.C. impairments but in other respects, the N.T.S.C. signal would remain intact.

The fact that the $Y_2/C_1$ signals of PAL and N.T.S.C. systems are not identical implies that there are two potential Y/C package digital standards for each line/field standard. In particular this applies to standards for digital recording. However, conversion from one standard to the other involves no cumulative loss.

The $Y_2/C_1$ signals are also useful for transcoding between colour systems of differing line and field standards. Such a transcoding operation includes line and field standards conversion which, in general, involves interpolation. This cannot be applied to the composite colour signals, and so they must be split into components which can be interpolated. The $Y_2/C_1$ signals represent the first stage of such a splitting.

Figure 29:
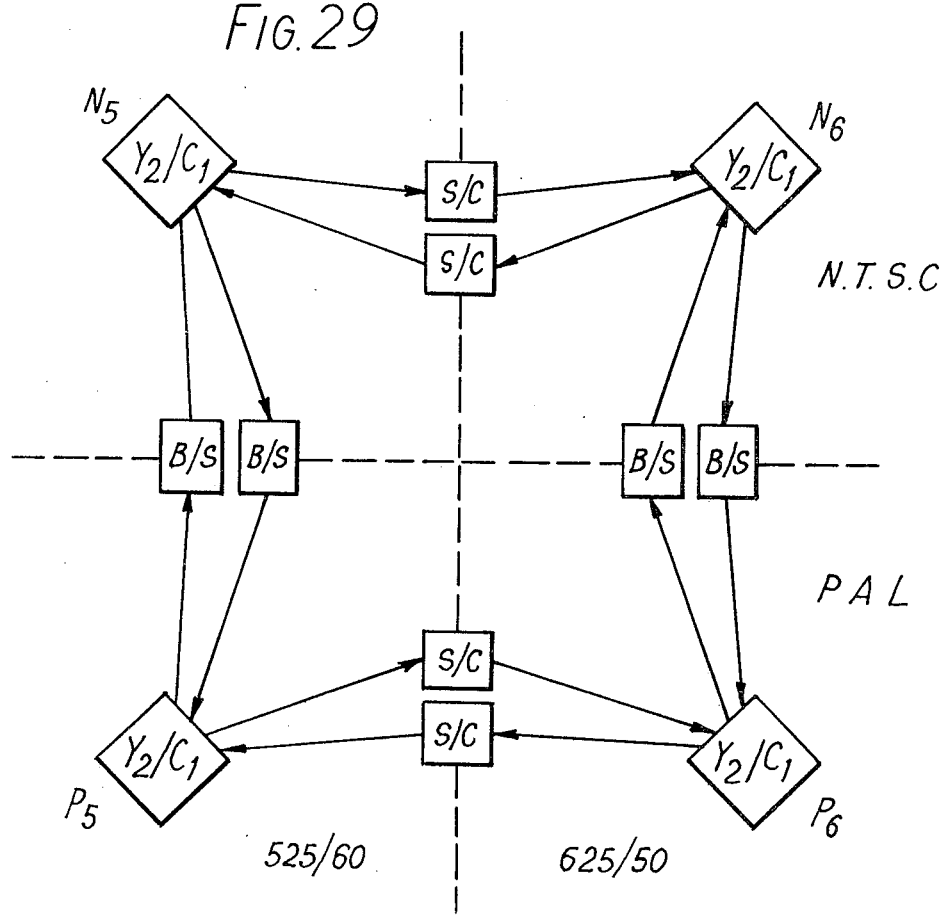
FIG. 29 illustrates the transition between PAL and N.T.S.C. signals of different line and field standards.

FIG. 29 shows such a transcoding between colour systems of differing line and/or field standards where, for example, the left-hand side has been designated 525/60 and the right-hand side 625/50. The relationships between the $Y_2/C_1$ signals and their respective composite and component signals have been omitted for clarity and either side represents FIG. 28. For example, conversion from 525/60 N.T.S.C. to 625/50 PAL involves the path N.T.S.C. to $Y_2/C_1$ followed by either route from $N_5$ to $P_6$ in FIG. 29 followed by $Y_2/C_1$ to PAL. In practice the route $N_5$ to $P_5$ to $P_6$ would be preferable as the $C_1$ signal of $P_5$ is easier to interpolate than that of $N_5$.

Now returning to FIG. 13, a careful inspection will show that the path Y,I,Q to N.T.S.C. constitutes an N.T.S.C. encoder, while the path N.T.S.C. to Y', I', Q' conversely constitutes an N.T.S.C. decoder. The use of such a coder and decoder together has advantages in that it makes use of the transparency which exists in the N.T.S.C. to $Y_2/C_1$ to N.T.S.C. path. Thus once the three separation signals have been encoded by such an encoder, subsequent decoding and recoding in the appropriate phase introduce, theoretically, no further impairment into the system. Also, luminance/chrominance cross-effects can be shown to be completely eliminated. This elimination of cross-effects depends only on the transparency of the $Y_2/C_1$ to N.T.S.C. to $Y_2/C_1$ path and is thus independent of the nature of the filters $F_{11}$ and $F_3$ in the Y, I, Q to $Y_2/C_1$ path and the filters $F_{21}$ and $F_4$ in the $Y_2/C_1$ to Y', I', Q' path. These filters can therefore be chosen with other factors in mind.

We have also appreciated that the transparency of the $Y_2/C_1$ to N.T.S.C. to $Y_2/C_1$ path is maintained if the delay element in the comb filters involved is any odd number of lines, e.g. 263 or 525 lines.

An encoder formed in this way thus operates by spectrum folding the luminance signal Y with respect to a phase-perturbed frequency which is twice the colour subcarrier frequency, comb filtering the resultant luminance signal with a modulus sine response having peaks at integral multiples of $f_L/N$ where $f_L$ is the line frequency and N is an odd integer. The I and Q signals are formed into a composite chrominance signal C based on I and Q, and this is modulated onto the phase perturbed colour subcarrier frequency. The modulated chrominance is comb filtered with a modulus sine response having peaks at odd integral multiples of $f_L/2N$ and the luminance and modulated chrominance signals are combined.

Conversely, an N.T.S.C. decoder thus constituted comb filters the input N.T.S.C. signal with a modulus sine response having peaks at integral multiples of $f_L/N$ where $f_L$ is the television line frequency and N is an odd integer. The comb filtered signal is then spectrum folded with respect to a phase perturbed frequency twice the colour subcarrier frequency to provide a luminance signal. The N.T.S.C. is furthermore separately comb filtered with a modulus sine response having peaks at odd integral multiples of $f_L/2N$ and this signal is multiplied by a phase perturbed subcarrier signal. The resultant can then be separated into its orthogonal I and Q components.

Preferably prefiltering is applied in the coder and post filtering in the decoder. In each case the spectrum folding can be achieved by multiplication by a phase perturbed signal of twice subcarrier frequency and the addition of the resultant to the original signal.

Finally, when used as a coder the filters $F_{11}$ and $F_{21}$, and $F_3$ and $F_{22}$ can be collapsed so as to require a minimum of delay elements. Similarly in a decoder the filters $F_{11}$ and $F_{21}$, and $F_{12}$ and $F_4$ can be collapsed.

Figure 30:
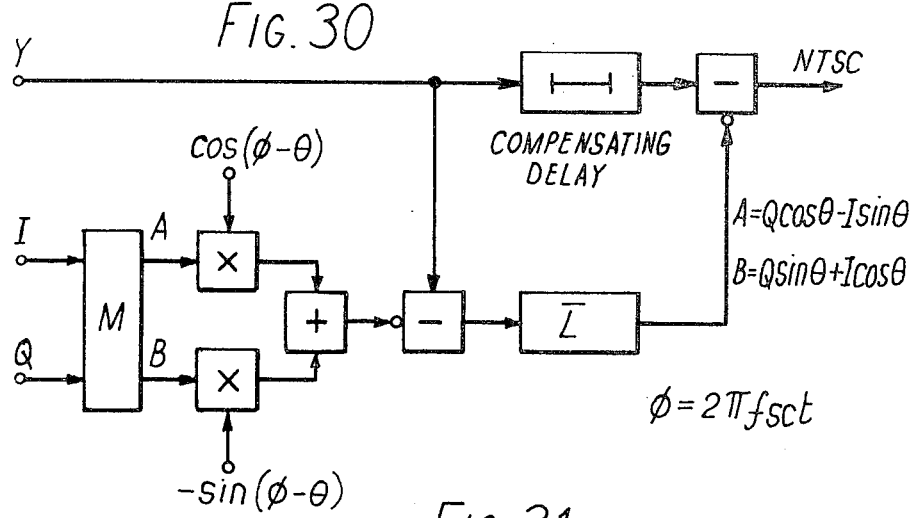
FIG. 30 is a block circuit diagram of an N.T.S.C. coder embodying the invention.
Figure 31:
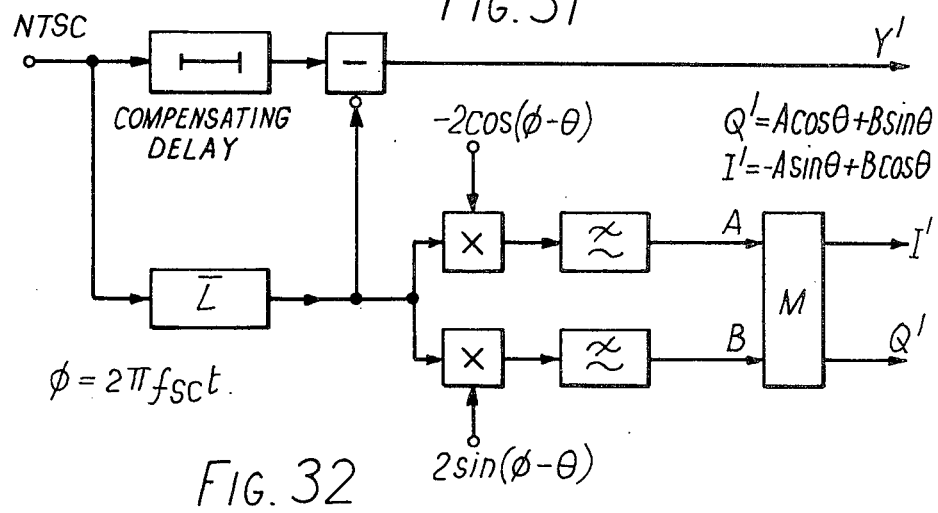
FIG. 31 is a block circuit diagram of an N.T.S.C. decoder embodying the invention.
Figure 32:
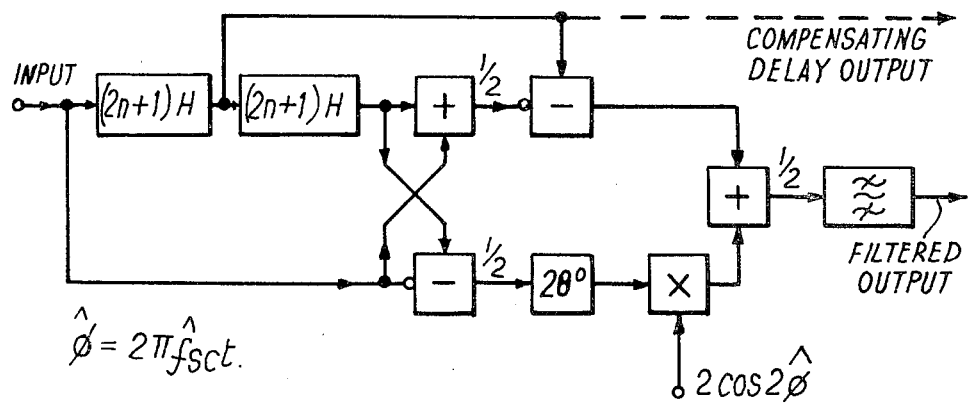
FIG. 32 is a block circuit diagram of a luminance stop filter, used in the coder of FIG. 30 and decoder of FIG. 31.

FIG. 30 shows an example of such a collapsed coder when the filters $F_{11}$, $F_{21}$, $F_{12}$, and $F_{22}$ are of the form shown in FIG. 2 and the filters $F_3$ and $F_4$ are of the form shown in FIGS. 15 and 16 and all contain the same delay element of $(2n+1)H$ where H is the period of one line scan i.e. the delay is of an odd number of lines. Similarly FIG. 31 shows the collapsed decoder based on the same assumptions. The form of the filter $\overline{L}$ which stops luminance is shown in FIG. 32. The compensating delay of the decoder may be part of the filter $\overline{L}$ as shown.

It will be noted that the filter $\overline{L}$ comprises two parallel paths, the one being a time-invariant filter taking weights of $-\frac{1}{4}, \frac{1}{2}, -\frac{1}{4}$ of signals separated by the delay elements. The other path multiplies the quarter-difference of signals separated by two delay elements by a phase-perturbed sinewave of twice the subcarrier frequency whose reference phase is as defined in FIG. 6(b).

Such collapsed forms of coder and decoder can be implemented using analogue techniques without recourse to sampling. They may also be implemented digitally using any convenient sampling frequency near three times the subcarrier frequency provided that a bandpass filter, containing the modulated chrominance region, precedes the multiplier in $\overline{L}$.

What is claimed is:

1. A method of digitally sampling the luminance component of an N.T.S.C. colour television signal, comprising:

sampling an input signal with a mean frequency of twice the colour subcarrier frequency; and changing the sampling phase between each pair of lines by an amount equal to half the interval between samples.

2. Apparatus for digitally sampling the luminance component of an N.T.S.C. colour television signal, comprising:
   sampling means for sampling with a mean frequency of twice the colour subcarrier frequency; and
   phase perturbing means for changing the sampling phase between each pair of lines by an amount equal to half the interval between samples.

3. A method of encoding Y, I and Q signals into an N.T.S.C. colour television signal, comprising:
   spectrum folding the luminance signal Y with respect to a frequency twice the colour subcarrier frequency, the sampling phase being changed between each pair of lines by an amount equal to half the interval between samples;
   comb filtering the resultant luminance signal using a delay of an odd number of lines to provide a modulus sine response having peaks at integral multiples of $f_L/N$, where $f_L$ is the television line frequency, and N is an odd integer;
   forming the I and Q signals into a composite chrominance signal C based on I and Q;
   modulating the chrominance signal C onto the phase perturbed colour subcarrier frequency;
   comb filtering the modulated chrominance signal with a modulus sine response having peaks at odd integral multiples of $f_L/2N$; and
   combining the luminance and modulated chrominance signals.

4. A method of decoding an N.T.S.C. colour television signal into Y, I and Q signals, comprising:
   comb filtering the N.T.S.C. signal using a delay of an odd number of lines to provide a modulus sine response having peaks at integral multiples of $f_L/N$, where $f_L$ is the television line frequency, and N is an odd integer;
   spectrum folding the said comb filtered signal with respect to a frequency twice the colour subcarrier frequency the sampling phase of which is changed between each pair of lines by an amount equal to half the interval between samples, to provide a luminance signal;
   comb filtering the N.T.S.C. signal with a modulus sine response having peaks at odd integral multiples of $f_L/2N$; and
   multiplying the last-mentioned comb filtered signal by a signal of subcarrier frequency the sampling phase of which is likewise changed.

5. An N.T.S.C. coder for encoding Y, I and Q signals into an N.T.S.C. colour television signal, comprising:
   luminance processing circuitry adapted to cause spectrum folding of a luminance input signal Y with respect to a phase-perturbed frequency twice the colour subcarrier frequency but with its phase inverted between each pair of lines to produce alias components in the video band, and to comb filter the resultant luminance signal using a delay of an odd number of lines to provide a modulus sine response having peaks at integral multiples of $f_L/N$, where $f_L$ is the television line frequency, and N is an odd integer;
   chrominance processing circuitry adapted to form the I and Q signals into a composite chrominance signal C based on I and Q, to modulate the chrominance signal C onto the phase perturbed colour subcarrier frequency, and to comb filter the modulated chrominance signal with a modulus sine response having peaks at odd integral multiples of $f_L/2N$; and
   combining means for combining the luminance and modulated chrominance signals.

6. An N.T.S.C. decoder for decoding an N.T.S.C. colour television signal into Y, I and Q signals, comprising:
   luminance processing circuitry adapted to comb filter the N.T.S.C. signal using a delay of an odd number of lines to provide a modulus sine response having peaks at integral multiples of $f_L/N$, where $f_L$ is the television line frequency, and N is an odd integer, and to cause spectrum folding of the comb filtered signal with respect to a phase-perturbed frequency twice the colour subcarrier frequency but with its phase inverted between each pair of lines to provide a luminance signal;
   chrominance processing circuitry adapted to comb filter the N.T.S.C. signal with a modulus sine response having peaks at odd integral multiples of $f_L/2N$, to multiply the last-mentioned comb filtered signal by a phase perturbed signal of subcarrier frequency, and to separate the multiplied signal into its orthogonal I and Q components.

* * * * *